US009854551B2

(12) United States Patent
Davis et al.

(10) Patent No.: US 9,854,551 B2
(45) Date of Patent: Dec. 26, 2017

(54) WIRELESS NETWORK FOR SENSOR ARRAY

(71) Applicant: The Charles Stark Draper Laboratory, Inc., Cambridge, MA (US)

(72) Inventors: Almir D. Davis, Quincy, MA (US); Roger J. Wilmarth, Andover, MA (US); Philip S. Babcock, IV, Westford, MA (US); Imran Khan, Natick, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/145,088

(22) Filed: May 3, 2016

(65) Prior Publication Data

US 2016/0323841 A1  Nov. 3, 2016

Related U.S. Application Data

(63) Continuation of application No. 14/697,831, filed on Apr. 28, 2015, now Pat. No. 9,743,370.

(51) Int. Cl.
*H04W 56/00* (2009.01)
*H04W 40/22* (2009.01)
(Continued)

(52) U.S. Cl.
CPC ..... *H04W 56/0015* (2013.01); *H04L 41/0893* (2013.01); *H04L 41/12* (2013.01);
(Continued)

(58) Field of Classification Search
CPC ..... H04W 4/005; H04W 52/48; H04W 40/20; H04W 84/18; H04L 7/02; H04L 41/0893
See application file for complete search history.

(56) References Cited

U.S. PATENT DOCUMENTS

| 6,320,820 B1 | 11/2001 | Gardner et al. ............... 367/81 |
| 7,423,931 B2 | 9/2008 | Martin, II et al. ............ 367/83 |

(Continued)

FOREIGN PATENT DOCUMENTS

| EP | 2808677 A1 | 12/2014 | ............ G01N 27/85 |
| RU | 2 264 617 C2 | 11/2005 | ............ G01N 27/82 |

(Continued)

OTHER PUBLICATIONS

Ahmad, et al., "A Survey of Low Duty Cycle MAC Protocols in Wireless Sensor Networks," Emerging Communications for Wireless Sensor Networks, InTech Open, 23 pages, Feb. 2011.
(Continued)

*Primary Examiner* — Jeffrey M Rutkowski
*Assistant Examiner* — Fangyan Deng
(74) *Attorney, Agent, or Firm* — Sunstein Kann Murphy & Timbers LLP

(57) ABSTRACT

A linear wireless sensor network includes network nodes having monotonically varying network node identifiers along each branch of the network. The network identifiers enable the nodes to forward network packets without use of routing tables. Low duty cycle wireless communication protocols enable network packets to be routed to all nodes of very large networks while consuming very little electrical power. Broadcast, rather than unicast, transmissions between nodes take advantage of favorable signal propagation conditions to forward messages using largest possible hops, skipping over nodes when possible, as well as automatically adapting to time- or spatially-varying conditions. A group of network packets is broadcast and forwarded by a most distant receiving node that received all packets of the group. A receiving node's clock is automatically adjusted, based on which packet(s) of a group of packets was received. A sending node synchronizes near-by receiving
(Continued)

nodes. Nodes are provisioned over-the-air, with built-in scheduling. Health and welfare information piggybacks on other network traffic.

19 Claims, 16 Drawing Sheets

(51) Int. Cl.
<table>
<tr><td>H04L 12/721</td><td>(2013.01)</td></tr>
<tr><td>H04L 12/24</td><td>(2006.01)</td></tr>
<tr><td>H04W 88/08</td><td>(2009.01)</td></tr>
<tr><td>H04W 8/08</td><td>(2009.01)</td></tr>
<tr><td>H04W 40/20</td><td>(2009.01)</td></tr>
<tr><td>H04W 84/18</td><td>(2009.01)</td></tr>
</table>

(52) U.S. Cl.
CPC ............ *H04L 45/72* (2013.01); *H04W 40/22* (2013.01); *H04W 8/08* (2013.01); *H04W 40/20* (2013.01); *H04W 84/18* (2013.01); *H04W 88/08* (2013.01); *Y02B 60/50* (2013.01)

(56) References Cited

U.S. PATENT DOCUMENTS

<table>
<tr><td>7,835,226 B2</td><td>11/2010</td><td>Kokosalakis et al. ........... 367/83</td></tr>
<tr><td>8,447,532 B1</td><td>5/2013</td><td>Goroshevskiy et al. ....... 702/42</td></tr>
<tr><td>8,542,127 B1</td><td>9/2013</td><td>Goroshevskiy et al. ..... 340/657</td></tr>
<tr><td>8,949,042 B1</td><td>2/2015</td><td>Goroshevskiy et al. ....... 702/38</td></tr>
<tr><td>2002/0116980 A1</td><td>8/2002</td><td>Kerr et al. ..................... 73/1.14</td></tr>
<tr><td>2005/0122233 A1*</td><td>6/2005</td><td>Isoyama .................. H04Q 9/00 340/870.11</td></tr>
<tr><td>2006/0182126 A1*</td><td>8/2006</td><td>Yuen ..................... H04W 40/20 370/400</td></tr>
<tr><td>2007/0115821 A1</td><td>5/2007</td><td>Sim et al. ..................... 370/231</td></tr>
<tr><td>2007/0140303 A1*</td><td>6/2007</td><td>Kim .................... B61L 27/0088 370/503</td></tr>
<tr><td>2008/0031213 A1</td><td>2/2008</td><td>Kaiser et al. ................. 370/338</td></tr>
<tr><td>2009/0319551 A1</td><td>12/2009</td><td>Jung et al. .................... 707/101</td></tr>
<tr><td>2013/0027029 A1</td><td>1/2013</td><td>Goroshevskiy et al. ..... 324/228</td></tr>
<tr><td>2013/0128786 A1</td><td>5/2013</td><td>Sultan et al. ................. 370/311</td></tr>
<tr><td>2013/0243038 A1*</td><td>9/2013</td><td>Rasband ............... H04W 8/005 375/133</td></tr>
<tr><td>2014/0293850 A1</td><td>10/2014</td><td>Huang et al. ................. 370/311</td></tr>
<tr><td>2015/0046582 A1</td><td>2/2015</td><td>Gelvin et al. ................. 709/224</td></tr>
<tr><td>2015/0330946 A1</td><td>11/2015</td><td>Davis et al.</td></tr>
</table>

FOREIGN PATENT DOCUMENTS

<table>
<tr><td>RU</td><td>2264617 C2</td><td>11/2005</td><td>............ G01N 27/82</td></tr>
<tr><td>WO</td><td>WO 2009/097427 A1</td><td>8/2009</td><td>............ G08B 23/00</td></tr>
<tr><td>WO</td><td>WO 2013/019136 A1</td><td>2/2013</td><td>............... F17D 5/06</td></tr>
<tr><td>WO</td><td>WO 2013/128210 A1</td><td>9/2013</td><td>............ G01N 27/82</td></tr>
<tr><td>WO</td><td>WO 2015/179237 A1</td><td>11/2015</td><td>............ G01N 27/83</td></tr>
</table>

OTHER PUBLICATIONS

Basu, et al., "Effect of Overhearing Transmissions on Energy Efficiency in Dense Sensor Networks," IPSN'04, 9 pages, Apr. 26-27, 2004.
De, et al., "ActSee: Activity-Aware Radio Duty-Cycling for Sensor Networks in Smart Environments," Department of Computer Science, Georgia State University, 8 pages, 2011.
Du, et al., "RMAC: A Routing-Enhanced Duty-Cycle MAC Protocol for Wireless Sensor Networks," Department of Computer Science, Rice University, pp. 1478-1486, 2007.
Dunkels, "The ContikiMAC Radio Duty Cycling Protocol," SICS Technical Report, T2011:13, ISSN 1100-3154, pp. 1-11, Dec. 2011.
Hashemi, et al., "Intra-Car Multihop Wireless Sensor Networking: A Case Study," Automotive Networking and Applications, IEEE Communications Magazine, vol. 52, No. 12, pp. 183-191, Dec. 2014.
Ilyas, et al., "Handbook of Sensor Networks: Compact Wireless and Wired Sensing Systems," CRC Press, 3 pages, 2005.
Jawhar, et al., "Ferry-Based Linear Wireless Sensor Networks," College of Information Technology, UAE University, pp. 1-6, 2013.
Jawhar, et al. "Linear wireless sensor networks: Classification and applications," Journal of Network and Computer Applications, vol. 34, pp. 1671-1682, 2011.
Jin, et al. "Monitoring of Distributed Pipeline Systems by Wireless Sensor Networks," Proceedings of the 2008 IAJC-IJME International Conference, 10 pages, 2008.
Karl, et al., "Protocols and Architectures for Wireless Sensor Networks," John Wiley & Sons, 5 pages, Oct. 8, 2007.
Léone, "Radio duty cycling," https://github.com/contiki-os/contiki/wiki/Radio-duty-cycling, 7 pages, Jul. 29, 2014.
Ludovici, et al., "Forwarding Techniques for IP Fragmented Packets in a Real 6LoWPAN Network," Sensors 2011, vol. 11, pp. 992-1008, Jan. 18, 2011.
Mohamed, et al., "Sensor Network Architectures for Monitoring Underwater Pipelines," Sensors 2011, vol. 11, pp. 10738-10764, Nov. 15, 2011.
Pasadas, et al., "Handheld Instrument to Detect Defects in Conductive Plates with a Planar Probe," 2011 IEEE International Instrumentation and Measurement Technology Conference, pp. 1-6, May 2011.
Rohrback Cosasco Systems, Inc., "Quicksand™ Erosion Detection System," Rohrback Cosasco Systems, Inc., Bulletin No. 700-J, 3 pages, Mar. 15, 2012.
Rohrback Cosasco System, Inc., "Cosasco® Wireless Best Practices: A Guide for Planning, Installation, and Commissioning," Rohrback Cosasco Systems, Inc., Bulletin No. AN-119, 8 pages, May 11, 2011.
Rohrback Cosasco Systems, Inc., "Quicksand™ Wireless Transmitter MWT-3905-QS," Rohrback Cosasco Systems, Inc., Bulletin No. 160-G, 6 pages, Jun. 27, 2012.
Sadeghioon, et al., "SmartPipes: Smart Wireless Sensor Networks for Leak Detection in Water Pipelines," Journal of Sensor and Actuator Networks, ISSN 2224-2708, vol. 3, pp. 64-78, Feb. 20, 2014.
Tiporlini, et al., "High Sensitivity Optically Pumped Quantum Magnetometer," The Scientific World Journal, vol. 2013, Article ID 858379, pp. 1-8, May 2, 2013.
Valliappan, "Wireless: What is clear channel assessment (CCA)?," Quora, http://www.quora.com/Wireless/What-is-clear-channel-assessment-CCA, 2 pages, Mar. 7, 2013.
Weiss, et al., "The importance of low power sensing for the Internet of Things," Dust Networks Product Group, Linear Technology Corp., 4 pages, Oct. 5, 2013.
Wikipedia, Wireless sensor network, Wikipedia, https://en.wikipedia.org/w/index.php?title=Wireless_sensor_network&oldid=606602738 , 9 pages, May 1, 2014.
Wikipedia, Energy harvesting, Wikipedia, https://en.wikipedia.org/w/index.php?title=Energy_harvesting&oldid=607544418, 10 pages, May 7, 2014.
Wikipedia, Ad hoc On-Demand Distance Vector Routing, Wikipedia, http://en.wikipedia.org/wiki/Ad_hoc_On-Demand_Distance_Vector_Routing, 3 pages, Aug. 7, 2014.
Wikipedia, Mesh networking, Wikipedia, http://en.wikipedia.org/wiki/Mesh_networking, 6 pages, Sep. 19, 2014.
Wikipedia, 6LoWPAN, Wikipedia, http://en.wikipedia.org/wiki/6LoWPAN, 4 pages, Aug. 20, 2014.
Wikipedia, Magnetostriction, Wikipedia, http://en.wikipedia.org/wiki/Magnetostriction, 2 pages, May 8, 2014.
Xu, et al., "On Localized Prediction for Power Efficient Object Tracking in Sensor Networks," Distributed Computing Systems Workshops, Proceedings, 23$^{rd}$ International Conference, pp. 434-439, May 19, 2003.
Zimmerling, et al. "Energy-Efficient Routing in Linear Wireless Sensor Networks," IEEE Xplore, 3 pages, Nov. 19, 2008.
International Searching Authority, International Search Report—International Application No. PCT/US2015/031092, dated Aug. 27, 2015, together with the Written Opinion of the International Searching Authority, 11 pages.

(56) References Cited

OTHER PUBLICATIONS

International Searching Authority, International Search Report—International Application No. PCT/US2016/014241, dated Apr. 15, 2016, together with the Written Opinion of the International Searching Authority, 14 pages.

* cited by examiner

WIRELESS NETWORK FOR SENSOR ARRAY

CROSS REFERENCE TO RELATED APPLICATIONS

This application is a continuation of U.S. patent application Ser. No. 14/697,831, filed Apr. 28, 2015, titled "Wireless Network for Sensor Array," the entire contents of which are hereby incorporated by reference herein, for all purposes

TECHNICAL FIELD

The present invention relates to wireless computer networks and, more particularly, to wireless computer networks for linear arrays of nodes, such as sensors along pipelines or roads.

BACKGROUND ART

Sensor arrays, such as sensors installed along pipelines, highways, railroad tracks or utility lines, are typically designed to operate for long periods of time, often years, once they have been installed, with little or no maintenance. Many such arrays form computer networks of nodes that communicate wirelessly with each other and ultimately with one or more central controllers (base stations), such as to collect sensor data or meter readings and forward them to the base stations or set sensor parameters or control other remote devices in response to commands from the base stations. The nodes may be installed in difficult-to-access locations, making maintenance, such as battery replacement, difficult and expensive.

Radio transmitters and receivers (transceivers) in the nodes provide the wireless communication between the nodes and between the nodes and the base stations. These radios can consume significant amounts of electric power. However, each node typically has a very limited electric energy source, such as a battery that is expected to keep the node operating for years, possibly for the entire expected life of the node. In some cases, the nodes are powered by solar, thermal or other types of energy harvesters, whose outputs are relatively small.

Consequently, energy-efficient wireless communication protocols have been developed. Most such protocols employ low duty cycles, in which the radios are switched on only periodically and for relatively short periods of time. For example, according to the ContikiMAC radio duty cycling protocol, the radios are switched on about eight times per second. The amount of time during which a radio is on, compared to the amount of time the radio is off, is referred to as the radio's duty cycle. Duty cycles as low as about 0.6% are used. While low duty cycle protocols save energy, they require nodes to maintain well synchronized clocks, so the nodes can turn their radios on at the same time or nearly the same time as their neighbors. Synchronizing clocks among a large number of nodes can be quite expensive in terms of energy and computer resource consumption. Improved low duty cycle protocols are, therefore, desirable.

SUMMARY OF EMBODIMENTS

An embodiment of the present invention provides a linear sensor network. The linear sensor network includes at least two network nodes and a base station. The at least two network nodes are logically arranged along a branch. The branch has a first end and a second end. Each network node of the at least two network nodes is associated with a respective network node identifier. The at least two network nodes are logically arranged along the branch according to their respective associated network node identifiers. The at least two network nodes are logically arranged along the branch, such that the network node identifiers vary monotonically along the branch, from the first end to the second end. The network node identifiers may monotonically increase along the branch, from the first end to the second end, or the network node identifiers may monotonically decrease along the branch, from the first end to the second end.

The base station includes a wireless transceiver. The base station is adjacent one end of the branch. A network node identifier is associated with the base station.

Each network node stores a representation of its respective network node identifier. Each network node includes a respective sensor and a respective wireless transceiver. Each network node collects data with its sensor and, in response to receiving a command originating at the base station, transmits the data via its wireless transceiver using at least one network packet.

Each network node of the at least two network nodes, except a first network node at one end of the branch and a last network node at the other end of the branch, forwards, via its wireless transceiver, network packets. Each network packet is forwarded by a respective succession of network nodes whose respective network node identifiers vary monotonically along the succession of network nodes.

Each network node may include a network packet source identifier, a network packet destination identifier, a network node identifier comparator and a network packet router. The network packet source identifier is coupled to the wireless transceiver. The network packet source identifier reads a source network node identifier in a received network packet. The network packet destination identifier is also coupled to the wireless transceiver. The network packet destination identifier reads a destination network node identifier in a received network packet.

The network node identifier comparator is coupled to the network packet source identifier and to the network packet destination identifier. The network node identifier comparator compares the stored representation of the node's network node identifier to the source network node identifier in the received network packet and to the destination network node identifier in the received network packet.

The network packet router is coupled to the network node identifier comparator. The network packet router determines whether to consider forwarding the received network packet based on a value of the source network node identifier, relative to the representation of the node's network node identifier, and on a value of the destination network node identifier, relative to the representation of the node's network node identifier.

The network packet router may determine whether to consider forwarding the received network packet without reference to a routing table.

The linear sensor network may also include a packet source and destination node identifier comparator. The packet source and destination node identifier comparator is coupled to the network packet source identifier and to the network packet destination identifier. The packet source and destination node identifier comparator compares the source network node identifier in the received network packet and the destination network node identifier in the received network packet.

The network packet router may be coupled to the packet source and destination node identifier comparator. The network packet router may determine whether to consider forwarding the received network packet also based on the value of the source network node identifier, relative to the value of the destination network node identifier.

Optionally, for each node, except the first network node and the last network node, the node's location on the branch logically partitions the branch into a first portion and a second portion, relative to the node. Each network node, except the first network node and the last network node, forwards, via its wireless transceiver, network packets received from respective nodes on the first portion of the branch to at least one node on the second portion of the branch. Each network node, except the first network node and the last network node, forwards, via its wireless transceiver, network packets received from respective nodes on the second portion of the branch to at least one node on the first portion of the branch.

Another embodiment of the present invention provides a method for forwarding network packets. The method includes arranging at least two network nodes logically along a branch according to respective network node identifiers associated with respective ones of the at least two network nodes. The branch has a first end and a second end. The network node identifiers vary monotonically along the branch, from the first end to the second end. The network node identifiers may monotonically increase along the branch, from the first end to the second end, or the network node identifiers may monotonically decrease along the branch, from the first end to the second end.

A base station is disposed adjacent one end of the branch. The base station includes a wireless transceiver. A network node identifier is associated with the base station.

A representation of its respective network node identifier is stored in each network node, such as in a memory of the network node. At each network node, data is collected using a sensor of the network node. In at least one of the at least two network nodes, in response to receiving a command originating at the base station, the data is transmitted via the network node's wireless transceiver using at least one network packet.

In each network node of the at least two network nodes, except a first network node at one end of the branch and a last network node at the other end of the branch, network packets are forwarded, via the network node's wireless transceiver. Each network packet is forwarded by a respective succession of network nodes whose respective network node identifiers vary monotonically along the succession of network nodes.

A group of packets may be forwarded using a furthest receiving node, i.e., using the biggest possible hop. Yet another embodiment of the present invention provides a method for routing at least two packets in a wireless linear network, from a first node, via a second node. The wireless linear network includes a first node, at least two second nodes proximate the first node and at least two additional nodes, all arranged along a branch. Each node has a node identifier. The node identifiers monotonically vary along the branch, from one end of the branch to the other end of the branch. The at least two packets includes an initial packet and at least one subsequent packet.

Without necessarily first negotiating time slots with the at least two second nodes, the first node wirelessly sequentially broadcasts each packet of the plurality of packets. Each packet may be broadcast exactly once. Each packet contains a sequence number and an indication of a total number of packets in the at least two packets. The sequence number identifies the packet within the at least two packets.

Each second node wirelessly receives at least one packet of the at least two packets directly from the first node. In response, each second node wirelessly transmits an acknowledgement message to the first node. The acknowledgement message contains the node identifier of the second node. The acknowledgement message identifies which at least one packet was received by the second node. The at least two second nodes thereby collectively transmit at least two transmitted acknowledgement messages.

The first node receives at least one acknowledgement message of the at least two transmitted acknowledgement messages. If, according to the at least one acknowledgement message received by the first node, at least one second node received all packets of the at least two packets, the first node selects one second node that received all the packets. The first node selects the second node, such that a difference between the node identifier of the first node and the node identifier of the selected second node is larger than a difference between the node identifier of the first node and the node identifier of any other second node that received all the packets. The first node wirelessly transmits an instruction message to the selected second node, instructing the selected second node to forward the plurality of packets.

Otherwise, within a predetermined number of make-up attempts, the first node broadcasts a set of the at least two packets, such that the set includes packets that were not received by at least one second node.

The set may include a union of packets that were not received by at least two second nodes.

A similar method may be used to forward a single packet, using a furthest receiving node, i.e., using the biggest possible hop.

Each second node may wirelessly transmit the acknowledgement message to the first node during a time slot assigned to the second node.

Each second node may wirelessly transmit the acknowledgement message according to a carrier sense multiple access protocol with collision detection and/or collision avoidance.

A receiver's clock phase may be adjusted, based on which packets were received and/or missed. Each second node may include a clock and a wireless transceiver. The method may further include each second node adjusting the second node's clock, based on timing of receipt of the at least one packet of the plurality of packets by the second node. The clock may be used to control when to turn on the second node's wireless receiver and/or when to turn off the wireless receiver.

If the second node did not receive the initial packet, the clock may be adjusted, such that the second node turns on its wireless receiver earlier in a cycle than previously.

If the second node did not receive all packets of the plurality of packets, the clock may be adjusted, such that the second node turns on its wireless receiver earlier in a cycle than previously, by an amount that depends at least in part on a number of packets not received by the second node.

Adjusting the clock may include adjusting the clock by an amount that depends at least in part on a number of packets not received by the second node.

Adjusting the clock may include adjusting the clock by an amount that depends at least in part on an amount of time the receiver was on before the initial packet was received by the second node.

If the second node received the initial packet, adjusting the clock may include adjusting the clock such that the second node turns on its wireless receiver later in a cycle than previously, by an amount that depends at least in part on an amount of time the receiver was on before the initial packet was received by the second node.

Nodes near a sender node may synchronize their clocks to the sender. An embodiment of the present invention provides a method for a first node to automatically identify second nodes in a wireless linear network. In so doing, the first node assigns priorities to the second nodes. The wireless linear network includes the first node, at least two second nodes proximate the first node and at least two additional nodes. All the nodes are arranged along a branch. Each node includes a wireless transmitter and a wireless receiver. Each node has a node identifier. The node identifiers monotonically vary along the branch. The network node identifiers may monotonically increase along the branch, from the first end to the second end, or the network node identifiers may monotonically decrease along the branch, from the first end to the second end.

The first node wirelessly broadcasts at least two time spaced-apart synchronization messages. The synchronization messages contain information about at least two transmit time slots. For each transmit time slot, the synchronization messages include information about a single respective potential second node, to which the transmit time slot is assigned.

Each second node receives at least one of the synchronization messages directly from the first node. Each second node identifies which one of the plurality of transmit time slots is assigned to the second node. In response to receiving at least one of the synchronization messages, each second node wirelessly transmits during its assigned transmit time slot. Each second node wirelessly transmits an acknowledgement message that includes the second node's identifier. Thus, collectively, the second nodes transmit a plurality of transmitted acknowledgement messages.

The first node receives at least one acknowledgement message of the plurality of transmitted acknowledgement messages. The first node prioritizes a set of the second nodes whose acknowledgement messages were received by the first node. The prioritization is based at least in part on the identifiers of the second nodes whose acknowledgement messages were received by the first node.

Each second node may include a clock. Each second node may adjust its clock, based on timing of receipt by the second node of at least one of the plurality of synchronization messages. Each second node may use the clock to control when to turn on its wireless receiver and/or when to turn off the wireless receiver.

Each second node may include a clock. Each second node may adjust its clock, based on timing of receipt by the second node of at least one of the plurality of synchronization messages. Each second node may use the clock to control when the second node enters a sleep state and/or when the second node wakes from the sleep state.

Prioritizing the set of second nodes may include, for each second node of the set of second nodes, assigning a priority to the second node based on a difference between the second node's identifier and the first node's identifier. A second node with a larger difference may be assigned a higher priority than a second node with a smaller difference.

In addition, for each second node in the set of second nodes, the first node may wirelessly transmit a prioritization message. The prioritization message may contain the priority assigned to the second node. The prioritization message may be transmitted during a receive time slot assigned to the second node.

After transmitting the prioritization message, the first node may transmit a synchronization confirmation request message. In response to receiving the synchronization confirmation request message, each second node in the set of second nodes may transmit a synchronization acknowledgement message during a respective time slot associated with the priority assigned to the second node.

The first node may store, in a memory, information about each second node in the set of second nodes. The information may include the node identifier of the second node and the priority assigned to the second node.

Over-the-air provisioning with built-in scheduling may be provided. Another embodiment of the present invention provides a method for updating the nodes in a network that includes at least two nodes. At least two messages are sent in the network. Each message contains update information and an indication of a future time.

Each node of the network receives at least one of the at least two messages. Each node of the network stores the update information contained in the at least one of the at least two messages. At the future time, each node of the network uses the stored update information to update the node.

Each node of the network may initiate a request to be awakened at the future time.

Each message may also contain an indication of a type of update. Each node may use the stored update information to update the node only if the node conforms to the type of update.

Each node may store the update information only if the node conforms to the type of update.

Health and welfare information may be "piggybacked" on other types of network packets. Yet another embodiment of the present invention provides a method for sending first network status information within a wireless linear sensor network of nodes. The wireless linear sensor network is communicatively coupled via a central controller to another network. One of the nodes collects the first network status information. The one of the nodes wirelessly receives a message from another one of the nodes. The one of the nodes stores the first network status information in the message, thereby producing a modified message. The one of the nodes wirelessly transmits the modified message.

The message may be devoid of any network status information, at least prior to being modified.

The message may contain second network status information. The one of the nodes compares the second network status information to the first network status information. Storing the first network status information in the message, thereby producing the modified message, may include storing the first network status information in the message, thereby producing the modified message only if the first network status information is more significant, according to a predetermined comparison scheme, than the second network status information.

Multiple network segments may be included in a wireless sensor network, each with its own time slot. An embodiment of the present invention provides a wireless sensor network. The network includes at least two network segments and a base station. Each network segment includes at least two respective nodes. Each node is a member of exactly one network segment. Each node includes a respective sensor and a respective wireless transceiver. Each node uses its wireless transceiver to transmit data derived from its sensor. Each node is disposed within wireless communication range of at least one other node of its respective network segment. Each node includes one of: (i) a first node of the network segment, (ii) a last node of the network segment or (iii) an intermediate node of the network segment. The first node and each intermediate node uses its transceiver to forward data it receives from a node of the network segment that is network-topologically more distant from the first node to a node of the network segment that is network-topologically closer to the first node. That is, all but the last node forward packets toward the base station.

The base station includes a wireless transceiver. The base station is disposed within wireless communication range of the first node of each network segment. The base station uses its wireless transceiver to receive data collected from the plurality of nodes' sensors. Each node operates according to a repeating time interval. Each time interval is divided into a plurality of time slots. Each network segment is associated with a unique time slot of the plurality of time slots. Each node transmits the data collected from its sensor during the time slot associated with the node's network segment and enters a power-saving sleep state during a remainder of each time interval.

Each time slot may be sufficiently long to enable sensor data to be forwarded from the last node to the base station within one day.

Each power saving sleep state may be at least as long as a sum of N−1 time slots, where N equals the number of time slots in each time interval.

Each time slot may be divided into at least two sub-slots. Each node: (a) uses its wireless transceiver during a sub-slot to receive sensor data from another node of the node's network segment, the another node being more distal from the base station than the node, and (b) uses the wireless transceiver during a subsequent sub-slot to forward the sensor data toward the base station.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1:
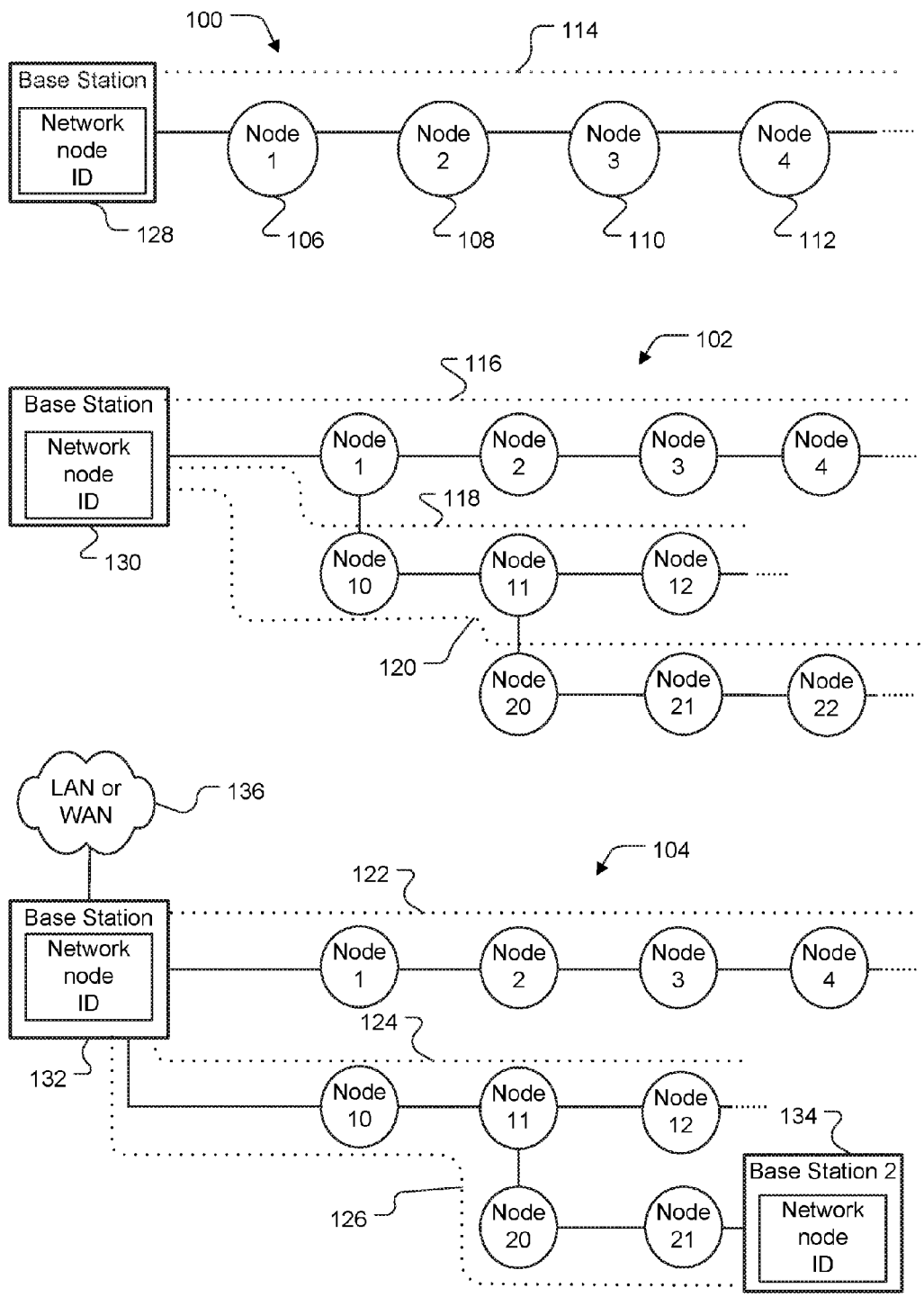
FIG. 1 is a schematic block diagram of several hypothetical linear networks, according to embodiments of the present invention.

In accordance with embodiments of the present invention, methods and apparatus are disclosed for constructing and operating wireless linear sensor networks, including wireless communication protocols for use by nodes of the wireless networks. A linear wireless sensor network includes network nodes having monotonically varying network node identifiers along each branch of the network. The network identifiers enable the nodes to forward network packets without use of routing tables. Low duty cycle wireless communication protocols enable network packets to be routed to all nodes of very large networks while consuming very little electrical power. Broadcast, rather than unicast, transmissions between nodes take advantage of favorable signal propagation conditions to forward messages using largest possible hops, skipping over nodes when possible, as well as automatically adapting to time- or spatially-varying radio propagation conditions. Nodes synchronize their clocks with their neighbors' clocks, without necessarily exchanging packets dedicated to clock synchronization.

Linear Networks, Monotonically Assigned Node Identifiers and Routing

Some embodiments of the present invention were inspired by a realization that, unlike most conventional computer networks, wireless sensor arrays and other arrays of wireless network nodes are often constructed with most or all their network nodes arranged along straight or curved lines, such as streets, pipelines or railroad tracks, with one or a small number of branches, i.e., zero or a small number of forks, compared to a total number of nodes, and that these arrays and networks are relatively static. Each node is one node in a line of nodes. However, the nodes need not be equidistantly distributed along the line. As used herein, a node's "neighbor" is a node on the same line and within wireless radio communication range of the node. Such a network is referred to herein as a "linear network." Linear networks are further described below.

The number of neighbors may vary as a node's radio propagation distance varies, such as between day and night or as the node's battery charge level varies. However, once the network is installed, the network topology, i.e., the arrangement of nodes along the line, typically does not change, or it changes infrequently compared to a rate of change in a typical local area network (LAN) in an office or on a factory floor. In a typical installation, the topology of a line of nodes remains constant for years. "Topology" or "network topology" here refers to the arrangement of nodes along a line of nodes, taking into consideration possible wireless communication links between pairs of nodes.

With the possible exception of a small number of nodes at or near each end of the line of nodes, each node of the line has relatively few neighbors, typically about six or fewer. The nodes at or near the ends of the line have fewer neighbors, in some cases only one neighbor.

From the perspective of each node, the node partitions its line of nodes into two portions. Typically about half of a node's neighbors are on one portion of the line, i.e., on one side of the node, i.e., network-topologically closer to one end of the line, and the other about half of the node's neighbors are on the other side of the node, i.e. network topologically closer to the other end of the line. A node exchanges all network traffic with nodes on one portion of the line via its neighbors on the corresponding side of the node, and it exchanges all network traffic with nodes on the other portion of the line via its neighbors on the other side of the node. A node's "nearest neighbor" is a neighbor that is closest to the node. All nodes, except the first and last node on a line, have exactly two nearest neighbors. The nodes at the ends of the line have one or more neighbors on only one side and exactly one nearest neighbor each.

Nodes forward network messages, as necessary. A typical line of nodes may contain tens, hundreds, thousands or more of nodes. Consequently, most network messages are forwarded many times before they reach their ultimate destinations.

If a first node is communicatively coupled to a third node via a second node, the first node is network-topologically adjacent the second node, but not network-topologically adjacent the third node. The first node is network-topologically closer to the second node than to the third node.

As used herein, "node" and "network node" are synonymous. As used herein, a branch is a strictly linear portion of a linear network, i.e., an unforked portion of the network. A linear network may include one or more branches. If a sensor network includes or is connected to a base station, for most nodes of a given branch of the network, some of their neighbors are network-topologically closer to the base station, and the other neighbors are network-topologically further from the base station. Typically, one node (sometimes referred to as a "first node") of the branch is network-topologically adjacent a base station, as well as being adjacent one other node of the network. Typically one other node, i.e., an "end node," is located at the other end of a line of nodes, i.e., the other end of the branch, and is network-topologically adjacent only one other node. Branches are discussed in more detail herein.

As noted, such networks are referred to herein as linear networks. As used herein, a linear network has a node-to-branch ratio of at least 50:1. According to the present disclosure, existing wireless communication protocols, such as 6LoWPAN (IPv6 over Low power Wireless Personal Area Networks), are modified, and new protocols are implemented, to take advantage of the linear nature of these networks to support more nodes, be more responsive and to operate more energy efficiently than according to conventional communication protocols. Nodes and networks that operate according to the improved protocols are also described.

FIG. 1 contains schematic representations of several hypothetical linear networks 100, 102 and 104. Not all nodes are shown, as indicated by ellipses. For example, four nodes 106, 108, 110 and 112 of the linear network 100 are all arranged along a single branch, represented by a dotted line 114. Linear network 102 includes three branches 116, 118 and 120, and linear network 104 includes three branches 122, 124 and 126. Note that branches 116, 118 and 120 have one or more nodes in common. For example, Node 1 is a member of branch 116, 118 and 120, and Node 10 is a member of branch 118 and 120. In some embodiments, nodes that are common between or among multiple branches have multiple network node identifiers, one for each branch, as discussed below.

Although each of the linear networks 100-104 has at least one base station 128, 130, 132 and 134, respectively, a base station is not required for a linear network. Base stations are also referred to herein as "edge routers" and "central controllers" and may connect a linear network, such as linear network 100, 102 or 104, to another network, exemplified by a local area network (LAN) or wide area network (WAN) 136, such as an Internet Protocol version 6 (IPv6) network.

Each node 106-112, Node 1, Node 2, etc. includes a sensor (not shown), such as a temperature sensor, a pressure sensor or a magnetometer. In many cases, a base station, such as base station 128, sends commands to nodes, such as commands to node 110, to collect data and return collected data to the base station 128.

Radio transmitters and receivers (transceivers, not shown in FIG. 1) in the nodes 106-112, Node 1, Node 2, etc. provide wireless communication between the nodes and between the nodes and the base stations 128, 130, 132. Due to limited radio ranges of the transceivers, some of these commands may need to be forwarded, from node to node, such as by one or more of nodes 106 and 108, along a branch, before reaching their respective destination nodes. Similarly, data sent by a node may need to be forwarded along the branch to the base station.

Power consumption constraints on the radios in the nodes limit radio range of the radios. Each node may be able to directly wirelessly communicate with only a relatively small number of nearby nodes, possibly only two nearest neighbors, rather than with all or most of the rest of the nodes of the network. Most nodes are too distant from a base station to wirelessly communicate directly with the base station. Even high-powered transmitters in the base station may not be able to reach distant nodes. Consequently, many messages must be forwarded many times ("hops"), by an equal number of intermediate nodes, before reaching their destinations, particularly messages between the base station and nodes far out along a branch. Each hop contributes to message latency.

However, as noted, according to embodiments of the present invention, communication protocols and nodes may be configured in ways to take advantage of the linear nature of these networks, particularly if nodes are monotonically numbered along each branch. In the following examples, the nodes are numbered such that their respective node numbers (network node identifiers) monotonically increase along a branch, in a direction away from a base node, from one end of the branch to the other end of the branch. Alternatively, a node numbering scheme in which the node numbers monotonically decrease along this direction may be used. As will be seen, either type of monotonic node identification scheme facilitates making routing decisions by nodes that receive messages, without requiring routing tables.

As used herein, "varying network node identifiers monotonically along a branch," from a first end to a second end, means either monotonically increasing the network node identifiers along a direction away from a base node, from the first end of the branch to the second end of the branch, or monotonically decreasing the network node identifiers along the direction away from a base node, from the first end of the branch to the second end of the branch.

Figure 2:
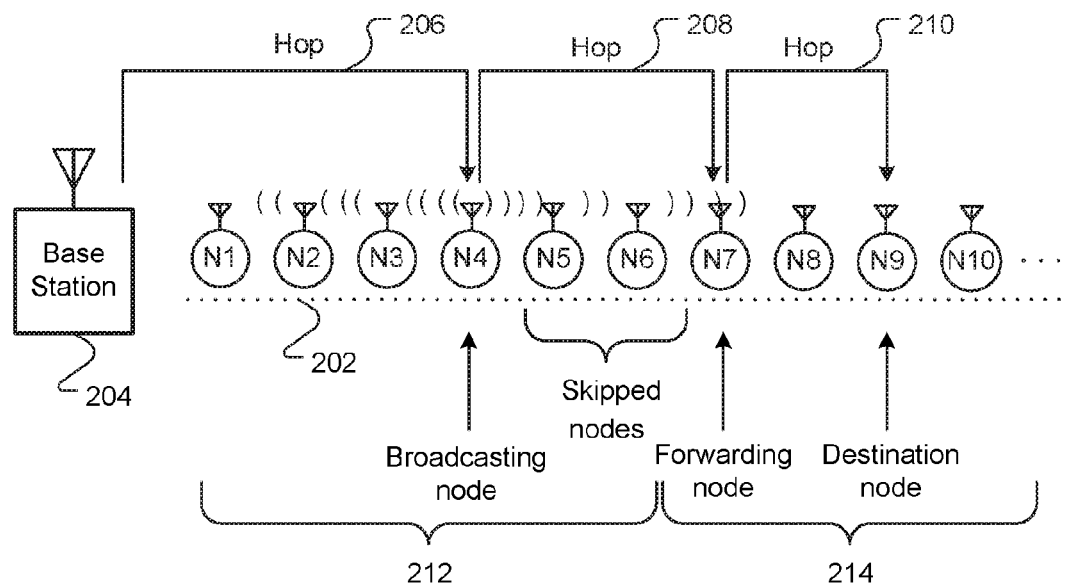
FIG. 2 is a schematic block diagram of wireless broadcasting by a node of a hypothetical linear network, according to an embodiment of the present invention.

For example, as schematically illustrated in FIG. 2, assume ten nodes of a linear network 200 are assigned network node identifiers N1-N10 that monotonically increase along a network branch 202. Of course, the branch 202 includes many more nodes. A base station 204 may also have an associated network node identifier, such as zero. Each node N1-N10 includes a transceiver for wirelessly communicating with other nodes N1-10 and, for some of the nodes, with the base station 204. In many contexts, given the transceivers' power and sensitivity and node placement, it is expected that each node N1-10 is within radio range of about three nodes in each direction, along the branch 202.

If a node N4 broadcasts a message destined to a node N9 located further out along the broadcasting node's branch 202, and nodes (for example, nodes N2, N3, N5, N6 and N7) on both sides of the broadcasting node N4 receive the message, the receiving nodes N2 and N3 with node numbers (in this example 2 and 3, respectively) less than the broadcasting node's number (4) can ignore the message, because they are further from the destination node N9 than the broadcasting node N4. Forwarding the message to either node N2 or N3 would be counterproductive. On the other hand, receiving nodes N5, N6 and N7 with node numbers (in this example 5, 6 and 7, respectively) larger than the broadcasting node's number (4) are potential forwarding nodes, because these nodes are closer to the destination node N9 than the broadcasting node N4. The potential forwarding nodes' node numbers are all greater than the broadcasting node's node number.

Figure 3:
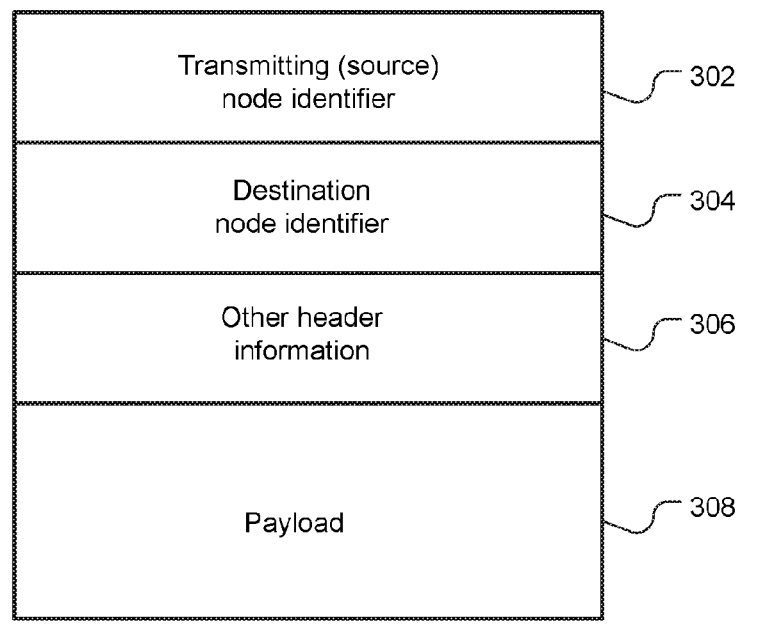
FIG. 3 is a schematic diagram of a network packet, according to an embodiment of the present invention.

Nodes N1-N10 communicate by sending and receiving network packets. FIG. 3 is a schematic diagram of an exemplary network packet 300. The network packet 300 includes a node number 302 (4 in the example of FIG. 2) of the broadcasting node N4 (a "source node identifier") and a node number 304 (9 in the example of FIG. 2) of the intended destination node N9 (a "destination node identifier"). The network packet 300 may also include other header information 306 and a payload 308. The payload 308 may include one or more commands, such as a command instructing a particular node to collect data with its sensor, and/or data, such as collected data being sent from a node to a base station.

Based on information in a network packet 300, each node that receives the network packet can automatically determine a direction, i.e., away from the base station or toward the base station, in which the network packet should be routed. If the destination node identifier 304 is greater than the source node identifier 302, the message should be routed in a direction away from the base station. On the other hand, if the destination node identifier 304 is less than the source node identifier 302, the message should be routed in a direction toward the base station. Of course, if the alternative node numbering scheme described above, in which node numbers monotonically increase along a direction toward the base station, the routing directions are reversed.

Furthermore, based on information in the network packet 300 and a receiving node's own node identifier number, each receiving node can automatically determine whether to ignore the message or store a copy of the message for potential forwarding. As noted with respect to FIG. 2, nodes with node identifier numbers less than a transmitting node's identifier can safely ignore messages destined to nodes having node identifier numbers greater than that of the transmitting node. Similarly, nodes with node identifier numbers greater than a transmitting node's identifier can safely ignore messages destined to nodes having node identifier numbers less than that of the transmitting node. If a node cannot safely ignore a received message, the node should store the message, in case the node is called upon to forward the message along the network, as described herein. Of course, if a receiving node's identifying number equals the destination node identifier number, the receiving node should process the message's command, data, etc.

Each node is provisioned with its own network node identification number. Each node therefore stores a representation of its respective network node identifier, such as in a memory. During a start-up phase, the network nodes execute an automatic neighbor discovery process and forward to the base station(s) information about the network branch's topology.

With renewed reference to FIG. 3, if the destination node number 304 (9) is greater than the broadcasting node's number 302 (4), indicating routing in a direction away from the base node, receiving nodes N2 and N3 having node numbers (2 and 3) less than the broadcasting node's number (4) can safely ignore the message 300, whereas receiving nodes N5, N6 and N7 having node numbers (5, 6 and 7) greater than the broadcasting node's number (4), but less than the destination node number (9), are potential forwarding nodes.

Furthermore, if more than one potential forwarding node N5, N6 and N7 receives the broadcast, the highest numbered node N7 among the receiver nodes is furthest along the branch, i.e., closest to the destination node N9, and could, therefore, be selected by the broadcasting node N4 to forward the message, thereby skipping over nodes N5 and N6. By this mechanism, each hop can move the message as far as possible, in terms of number of nodes along the branch, within radio range of the broadcasting node N4. Thus broadcasting, rather than transmitting a network packet to a specific one or more intended receiver (unicasting or multicasting), takes advantage of favorable propagation conditions, when they exist. In contrast, prior art networks forward messages only one node per hop or they transmit packets to only one or more specified receiver nodes. The improvement presented here over the prior art is made possible by broadcasting and by monotonically numbering the nodes along the length of each network branch. These and other structural features of embodiments improve network efficiency, reduce power consumption and provide other benefits.

It should be noted that the nodes of a branch need no routing tables to make routing decisions. A simple comparison between a network packet's source 302 (FIG. 3) and destination 304 node identifiers indicates a direction, i.e., toward or away from a base station, in which the network packet 300 should travel along the branch. Once the network packet's travel direction has been determined, simple comparisons between a receiving node's network identifier and the network packet's source and destination node identifiers indicate whether the receiving node is a potential forwarding node. Essentially, network packets are "self-routing," in that they contain information that makes routing decisions almost trivial for the nodes.

Figure 4:
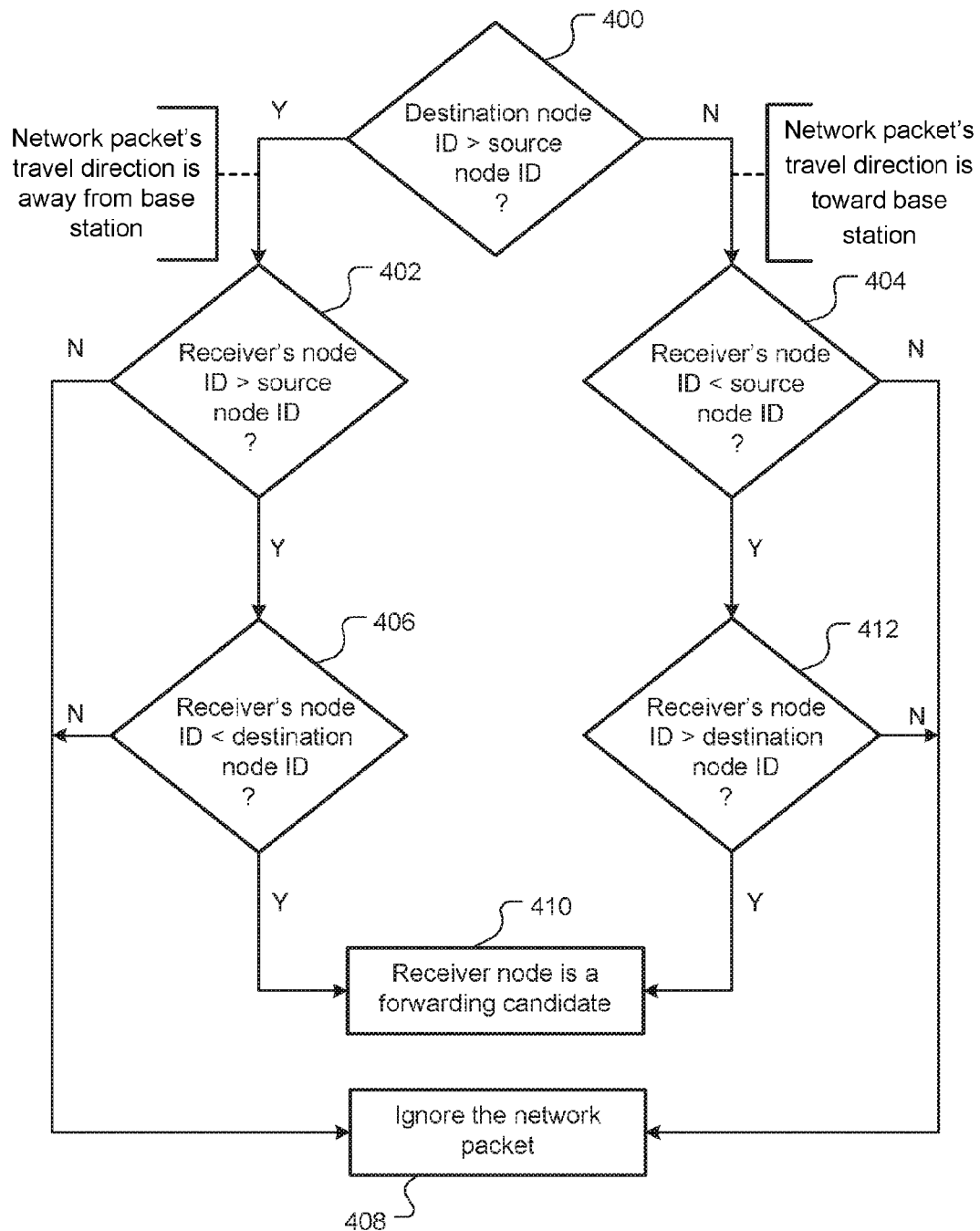
FIG. 4 is a schematic flowchart illustrating network node routing decisions, without a routing table, according to an embodiment of the present invention.

FIG. 4 contains a flowchart illustrating how network nodes can make routing decisions, without a routing table. At 400, if a received network packet's destination node identifier 304 (FIG. 3) is greater than its source network node identifier 302, the network packet's travel direction is away from the base station and control passes to 402, otherwise the travel direction is toward the base station and control passes to 404. At 402, if the receiving network node's network identifier is greater than the source network node identifier 302, control passes to 406, otherwise the receiving network node is on the "other side" of the source network node and not in a position to efficiently forward the network packet, in which case control passes to 408, where the network packet is ignored. At 406, if the receiving network node's network identifier is less than the destination node identifier 304, the receiving node is a forwarding candidate and control passes to 410, otherwise the receiving node is "beyond" the destination network node and can ignore the received network packet, in which case control passes to 408.

For network packets traveling toward the base station, at 404, if the receiving network node's network identifier is less than the source network node identifier 302, control passes to 412, otherwise the receiving network node is on the "other side" of the source network node and not in a position to efficiently forward the network packet, in which case control passes to 408, where the network packet is ignored. At 412, if the receiving network node's network identifier is greater than the destination node identifier 304, the receiving node is a forwarding candidate and control passes to 410, otherwise the receiving node is "beyond" the destination network node, i.e., too close to the base station, and can ignore the received network packet, in which case control passes to 408.

This flowchart assumes network node identifiers monotonically increase along the branch in a direction away from the base station. If the network node identifiers monotonically increase in a direction toward the base station, the senses of the comparisons in 402, 404, 406 and 412 are reversed.

Figure 5:
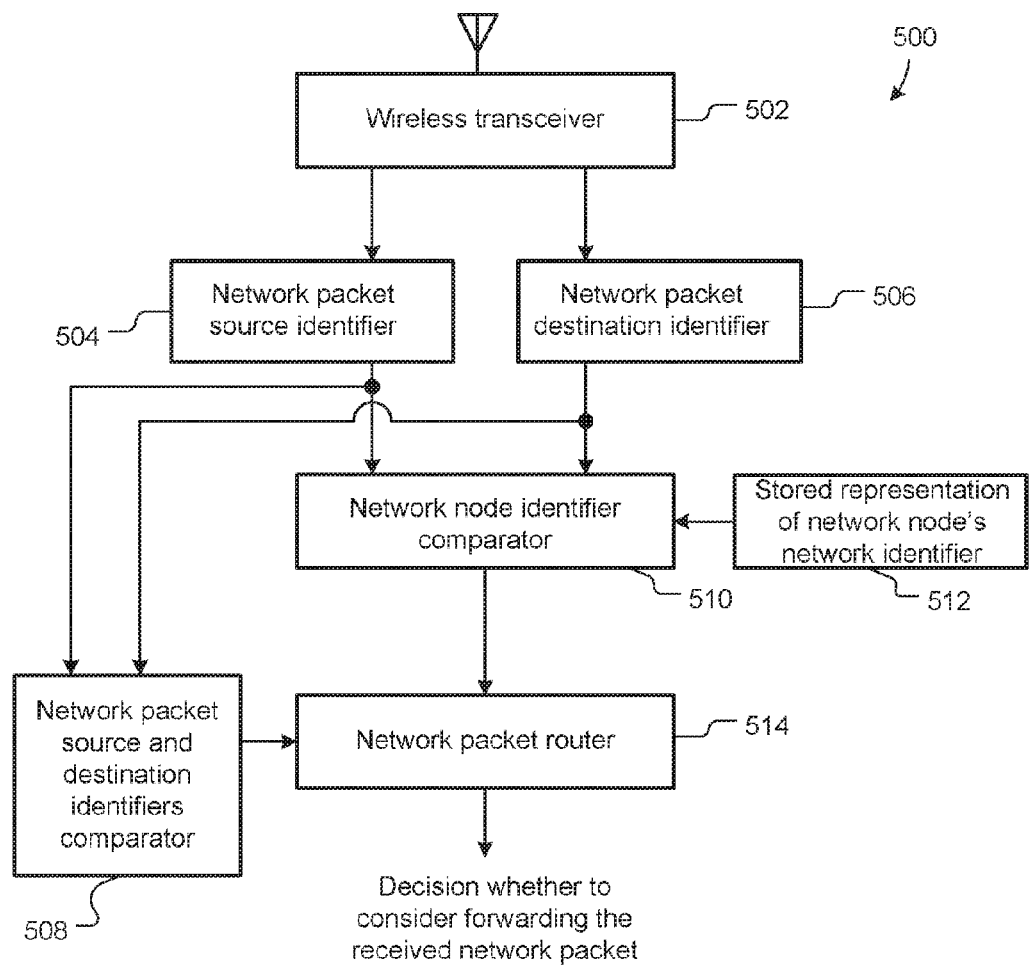
FIG. 5 is a schematic block diagram of network packet routing logic in a network node, according to an embodiment of the present invention.

FIG. 5 is a schematic block diagram of a network node 500, according to an embodiment of the present invention. In some embodiments, blocks of FIG. 5 implement the network packet routing logic described herein, with respect to the flowchart of FIG. 4. A wireless transceiver 502 receives transmissions, typically broadcast transmissions, from a base station and other nodes. For received transmissions that include network packets, a network packet source identifier 504 examines ones of the received network packets to identify the network node identifiers of the nodes or base station that transmitted the network packets. Similarly, a network packet destination identifier 506 examines ones of the received network packets to identify the network node identifiers of the nodes or base station, to which the network packets are destined.

A network packet source and destination identifiers comparator 508 compares the source and destination network identifiers identified by the network packet source identifier 504 and the network packet destination identifier 506. For each received network packet, the network packet source and destination identifiers comparator 508 determines in which direction, i.e., toward the base station or away from the base station, the network packet is to be forwarded.

A network node identifier comparator 510 compares a stored representation 512 of the receiving network node's network identifier to the source network identifiers and to the destination network identifiers. For each received network packet, the network node identifier comparator 510 determines whether the receiving network node is: (a) between the transmitting network node and the destination node, (b) "before" the transmitting network node or (c) "beyond" the destination network node, relative to the direction in which the network packet is to be forwarded.

A network packet router 514 determines whether to consider forwarding a given received network packet based on: (a) the value of the source network node identifier, relative to the value of the destination network node identifier, (b) the value of the source network node identifier, relative to the representation of the node's network node identifier, and (c) the value of the destination network node identifier, relative to the representation of the node's network node identifier.

As noted, no routing table is needed for the network packet router 514 to determine whether to consider forwarding the received network packet. For example, the comparisons and determinations may be as described, with reference to the flowchart of FIG. 4.

Unlike the prior art, network packet routing logic according to embodiments of the present invention does not depend on the number of nodes in a network or a branch. The logic depicted in FIG. 4 is independent of the number of nodes in a network or a branch. It should be noted that sensor networks, according to embodiments of the present invention, may include thousands of network nodes or more, even millions of network nodes. On the other hand, prior art routing algorithms rely on routing tables, whose sizes depend on network sizes.

Memory sizes in nodes of sensor networks are typically constrained. Therefore, storing large routing tables poses problems for sensor networks. In addition, electrical power available for the memories, and for processors that execute instructions, is typically limited in nodes of sensor networks. Therefore, adding to, deleting from and traversing entries in a routing table pose problems for sensor networks. Given the power and memory constraints in conventional sensor network nodes, up to only about 10-30 nodes can be supported by prior art routing tables. These and other problems are solved by embodiments of the present invention.

Using the routing logic described herein, nodes along a branch forward network packets to their destinations, often utilizing a series of hops, exemplified by hops 206, 208 and 210 (FIG. 2). For example, the base station 204 may broadcast a network packet. The highest numbered node that receives the broadcast (N4) may forward the network packet by broadcasting it. The highest numbered node that receives the node's broadcast (N7) may forward the network packet, etc., until the network packet is received by the destination node (N10), as specified in the destination node identifier field 304 (FIG. 3) of the network packet.

After a node, for example node N7, receives a network packet, the node N7 can be thought of as partitioning the network branch 202 into two portions, one portion 212 (FIG. 2) extending from the base station 204 to the network node N6, which in this example is the node's N7 nearest neighbor, on the base station side, and the other portion 214 extending from the other nearest neighbor N8 to the other end of the branch. Each network node, except the first network node N1 and the last network node, forwards packets received from nodes in the first portion 212 of the branch to nodes in the other portion 214, and it forwards network packets received from nodes in the other portion 214 to nodes in the first portion 212.

Other network packets, such as network packets with commands from the base station 204 to one or more nodes N1-N10 along the branch 202 or network packets with sensor data sent by one or more nodes N1-N10 to the base station 204, are forwarded along the branch 202. In this way, each network packet is forwarded by a respective succession of network nodes whose respective network node identifiers vary monotonically along the succession of network nodes. That is, each network packet is forwarded by a succession of network nodes (N4 and N7 in the example above). The network node identifiers of each succession of nodes varies monotonically along the path of each network packet. For example, the network identifiers of these nodes N4 and N7 increase monotonically along the path of the network packet, from the base station 204 to the destination node N9.

When designing or provisioning a linear network, it may be prudent to assign to adjacent nodes node identifier numbers that are different by more than one. Skipping node identifier numbers in this way facilitates later adding nodes between previously adjacent nodes, without renumbering existing nodes. As noted, the disclosed routing logic is independent of the number of network nodes. Therefore, if nodes are added or deleted from a network, the routing logic need not be changed, and no routing tables need to be revised.

Many factors can influence radio range. For example, power supply voltage may affect transmitter power output and receiver sensitivity. Radio noise from nearby heavy equipment may interfere with radio reception, limiting receivers to receiving only strong signals from nearby nodes. Radio signal propagation may vary between daytime and nighttime, for example due to atmospheric changes. It should be noted that as radio range varies over time, such as between daytime and nighttime or as a result of variations in battery voltage or intermittent radio noise, the protocol discussed with respect to FIG. 2 automatically adapts and skips as many nodes as possible at the time of each hop. The number of nodes skipped for a given message may also vary spatially, i.e., along the branch 202, such as due to differences in local noise levels or sunlight available to energy harvesters.

Low Duty Cycle Communication Protocols

Some radio duty cycling protocols support relatively small maximum packet sizes. However, if a relatively large amount of data is to be sent along a wireless linear network, the data may be partitioned (fragmented) into several packets, so as to conform to a wireless protocol's maximum packet size, and the packets may be sent sequentially. For example, the ContikiMAC protocol allows maximum packet sizes much smaller than IPv6 packets, and a linear network may be called upon to carry network traffic from an IPv6 network. IPv6 packets may, therefore, be fragmented and sent using a plurality of ContikiMAC-like packets. For example, the base station 132 (FIG. 1) may receive an IPv6 packet from the WAN or LAN 136 and fragment the packet into a plurality of smaller ContikiMAC-like packets for transmission to one or more of the nodes (Node 1, . . . Node 21) of the network 104.

Sending a plurality of packets as a series of successive closely-spaced (in time) packets can be energy efficient, because once a receiver node turns on its radio, the receiver can receive successive packets until the transmitting node stops transmitting packets, or at least until the receiving node stops receiving packets. The receiving node can sent an acknowledgement after receiving the last sequential packet, rather than after receiving each packet of the series.

Figure 6:
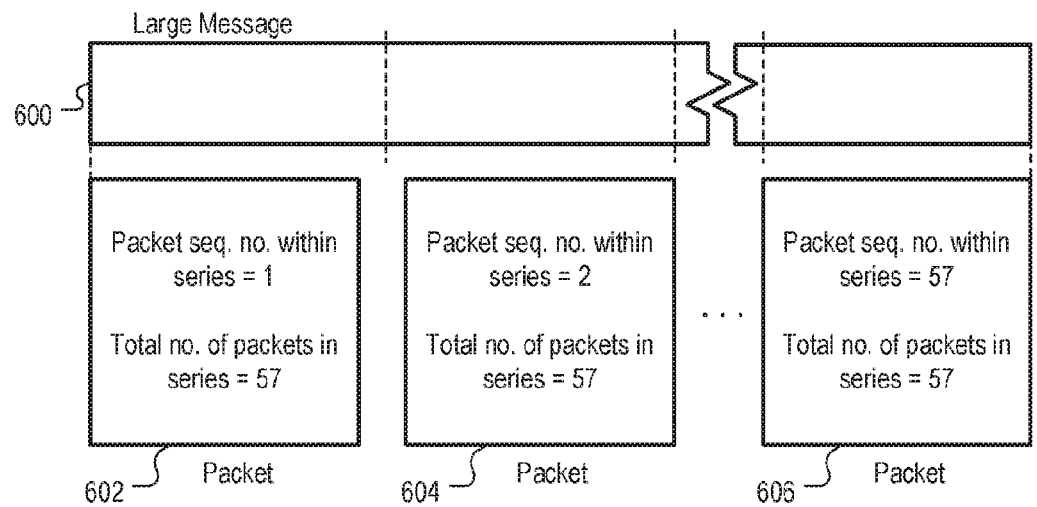
FIGS. 6 and 7 are schematic diagrams of a large message being partitioned into a set of hypothetical smaller network packets, according to embodiments of the present invention.

According to an embodiment of the present invention, when a series of packets is transmitted by a node, each packet of the series contains a packet sequence number identifying the packet within the series of packets and an indication of a total number of packets in the series of packets, as exemplified in FIG. 6. Here, a large message 600 is fragmented into a series of packets exemplified by packets 602, 604 and 606.

Although the large message 600 may be sent as a packet in another network, such as via an IPv6 network, in the interest of clarity it is referred to in this example as a "large message," and smaller packets 602-606 sent via a linear network are referred to as "packets." Furthermore, it should be noted that a series of packets need not necessarily represent fragments of a larger message. For example, each packet of a series of packets may be destined to a different node, or it may be otherwise independent of other packets of the series of packets.

With continued reference to FIG. 6, the packet sequence number may be a number relative to the initial packet. For example, the initial packet may be numbered 1, and each successive packet of the series may be numbered 2, 3, 4, etc. That is, each series of packets begins with packet sequence number 1. The indication of the total number of packets in the series may be equal to the packet sequence number of the final packet of the plurality of packets. Of course, alternatively, zero-based numbering, or another packet numbering scheme, may be used.

Figure 7:
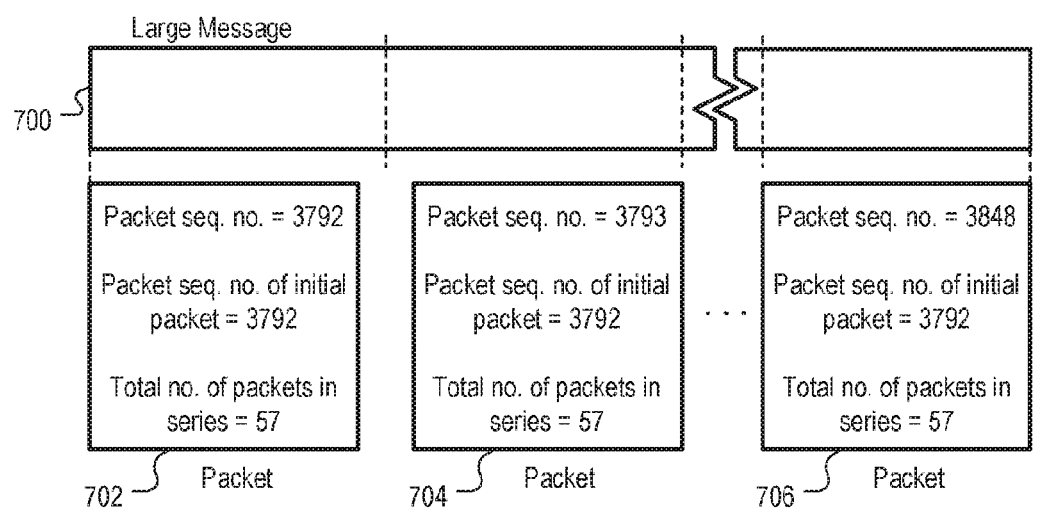

Alternatively, as exemplified in FIG. 7, packets 702-706 may be numbered such that the sequence numbers span more than one series. In these cases, each packet should contain the sequence number of the initial packet of the series and the total number of packets in the series, or the sequence number of the last packet of the series and the total number of packets in the series, or the sequence number of the initial packet and the sequence number of the last packet in the series or some other combination of information that enables a receiver to calculate how many packets are in the series (i.e., each packet should contain an indication of a total number of packets in the plurality of packets) and the current packet's position, relative to the beginning of the series of packets (i.e., each packet should contain a sequence number identifying the packet within the plurality of packets).

Forwarding a Group of Related Network Packets

As discussed with respect to FIG. 2, embodiments of the present invention forward network packets by broadcasting, so the network packets can be forwarded as far as possible in each hop. In some embodiments, all network nodes that receive a network packet broadcast, and that are candidates for forwarding the received network packet (for example, nodes N5, N6 and N7 in FIG. 2), send acknowledgement messages back to the broadcasting node N4 identifying themselves, so the broadcasting node N4 can select one of the receiving nodes to be the forwarding node. Other things being equal, the broadcasting node N4 selects the receiving node (N7 in this example) that is furthest from the broadcasting node N4, but generally not a node that is beyond the destination node (N9 in this example).

In some embodiments, each node is allocated a time slot during which it may broadcast, so as to prevent interference from other nodes. An exemplary time slot allocation scheme is depicted schematically in FIG. 8. In this example, during Time Slot 0, a base station may transmit. During Time Slot 1, node N1 may transmit. During Time Slot 2, node N2 may transmit, etc. Additional time slots may be added for additional base stations, if necessary. The group 800 of time slots repeats. Optionally, a delay time 802 is incurred between repetitions of the group of time slots. During the delay time 802, some nodes may use their respective sensors to collect data and/or enter power-saving sleep states. All time slots may, but need not, be of equal duration. For example, Time Slot 0 may be longer than each of the other time slots to permit the base station to send more messages or longer messages than each of the network nodes may send.

For long branches, where broadcasts from nodes far from the base station are not likely to interfere with broadcasts from nodes proximate the base station, time slots may be shared by multiple nodes. For example, if broadcasts are not likely to propagate a distance spanned by "n" nodes, the time slot allocation scheme depicted schematically in FIG. 9 may be used. In this example, every "n" nodes along the branch share a common time slot. Thus, the number of time slots may be less than the number of nodes on a branch.

Figure 8:
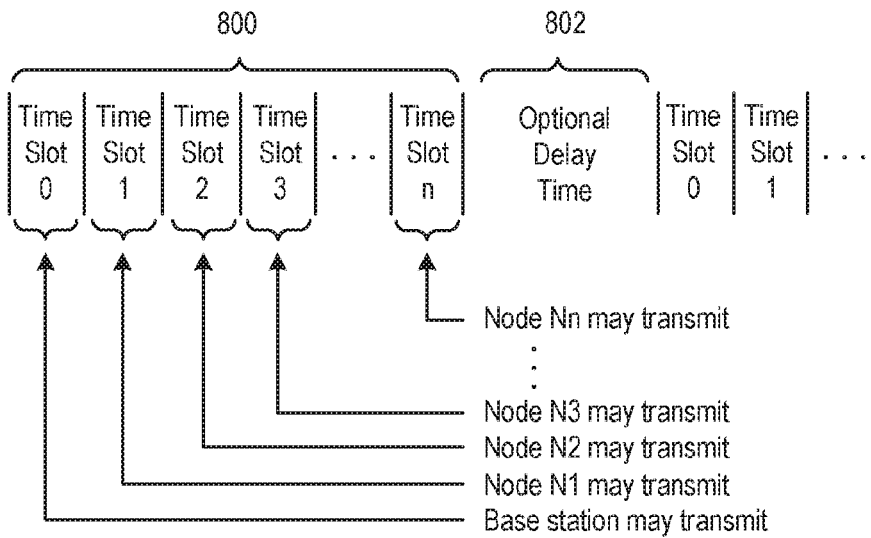
FIGS. 8 and 9 are schematic illustrations of time slot allocation schemes, according to embodiments of the present invention.
Figure 9:
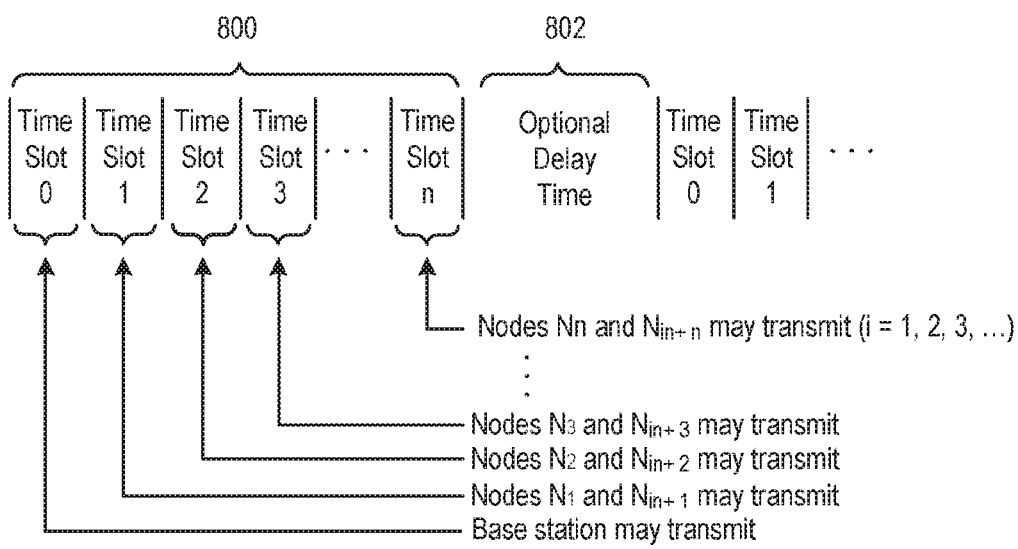

Returning again to FIG. 2, and with continued reference to FIGS. 8 and 9, assume a broadcasting node, for example node N4, is sending or forwarding a network packet destined to node N9. Node N4 broadcasts the network packet during its time slot, and nodes N5, N6 and N7 receive the broadcast. During their respective time slots (during the current group 800 of time slots or, alternatively, during a subsequent group 800 of time slots), nodes N5, N6 and N7 broadcast respective acknowledgement messages, indicating their respective network node identifiers and acknowledging receipt of the network packet. The acknowledgement messages are addressed to node N4, and node N4 receives the plurality of acknowledgment messages.

Node N4 selects one of the nodes (N5, N6 or N7) as a forwarding node, and during node N4's subsequent time slot, node N4 broadcasts a message indicating the selected node. This broadcast message may be thought of as passing a token to the selected forwarding node. As noted, other things being equal, node N4 selects the node furthest along the branch, toward the destination node N9, that is not beyond the destination node N9. For this example, assume node N7 is selected.

Upon receiving the token, node N7 repeats the process previous performed by node N4, and so on, until node N9 receives the network packet. Optionally, node N7 acknowledges receipt of the token, such as by sending a second acknowledgement message or by including an acknowledgement in its broadcast of the network packet. Presumably, node N4 receives the broadcast of the network packet and, therefore, receives confirmation that the network packet has been forwarded, or at least that node N4 now has the token and, therefore, it has responsibility for forwarding the network packet.

As noted with respect to FIGS. 6 and 7, sending a plurality of network packets as a series of successive closely-spaced (in time) packets can be energy efficient. In some embodiments, multiple network packets are broadcast by a single network node during a single time slot to take advantage of this energy efficiency. For example, with reference to FIGS. 8 and 9, multiple network packets may be broadcast by a single network node during a single time slot. However, not all network nodes that receive the broadcast may receive all the network packets. For example, bursty local electromagnetic interference (EMI) may prevent some of the receiving nodes receiving all the network packets. In another example, some of the nodes may wake from a power-saving sleep state too late to receive all the network packets, or some nodes may enter the power-saving sleep state before receiving all the network packets.

Figure 10:
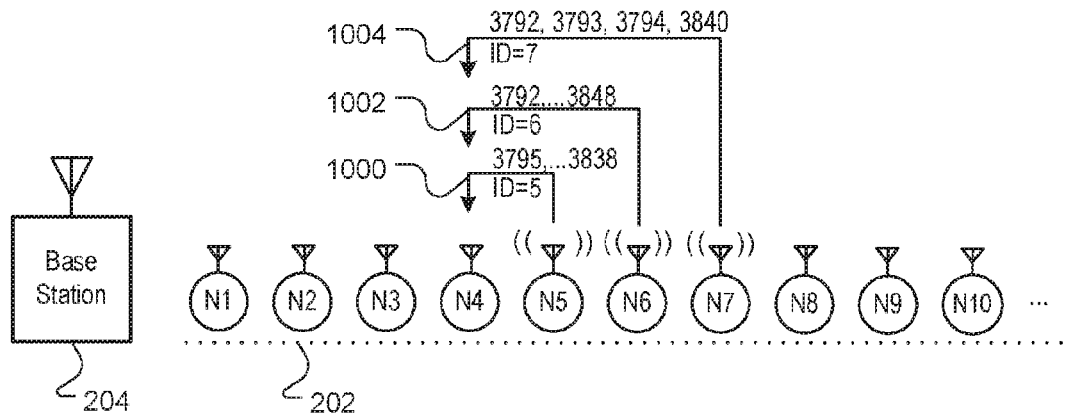
FIG. 10 is a schematic block diagram, similar to FIG. 2, illustrating acknowledgement messages sent by receiving nodes in a hypothetical linear network, according to an embodiment of the present invention.

In some embodiments, the nodes that receive any of the network packets then broadcast acknowledgement messages that indicate their respective network node identifiers and which network packet(s) they received. For example, assume the network packets 702-706 (FIG. 7), i.e., network packet sequence numbers 3792-3848, are broadcast by node N4 (FIG. 2) and some or all of the network packets are received by each of nodes N5, N6 and N7, as shown in FIG. 2. FIG. 10 schematically illustrates this example, in which node N5 receives network packet sequence numbers 3795-3838, node N6 receives network packet sequence numbers 3792-3848 and node N7 receives network packet sequence numbers 3792-3794 and 3840.

In their respective acknowledgement messages 1000, 1002 and 1004, nodes N5, N6 and N7 indicate their respective network node identifiers and which network packet sequence numbers they received. (Unlike in FIG. 2, symbols indicating radiation from antennas of the nodes N5, N6 and N7 do not indicate propagation distance in FIG. 10.) Thus, collectively, nodes N5, N6 and N7 broadcast a plurality of acknowledgement messages, and node N4 receives this plurality of acknowledgement messages. The acknowledgement messages may be broadcast during the respective receiving nodes' (N5, N6 and N7) time slots. Optionally or alternatively, all the acknowledging nodes may vie for access to a broadcast medium according to a carrier sense, multiple access protocol with collision detection and/or collision avoidance.

If at least one of nodes N5, N6 and N7 receives all the network packets, node N4 selects the node that receives all the network packets and is furthest along the branch 202 toward the destination node N9. In this case, a difference between the node identifier of the broadcasting node N4 and the node identifier of the selected node (N5, N6 or N7) is larger than a difference between the node identifier of the broadcasting node N4 and the node identifier of any other nodes that receive all the packets (N5, N6 or N7). In the example of FIG. 10, only one node N6 received all the network packets. The broadcasting node N4 then broadcasts a message passing the token to the selected node, i.e., node N6 in the example of FIG. 10.

However, if none of the receiving nodes N5, N6 and N7 receive all the packets of the group of packets, the broadcasting node N4 determines a set of "make-up" packets and broadcasts the make-up packets. The set of make-up packets includes at least the packets not received by at least one of the nodes N5, N6 and N7 that acknowledge receiving at least one of the network packets. The make-up packets may be selected based on which node failed to receive the fewest network packets, which packets the furthest acknowledging node failed to receive, which packets were not received by the furthest acknowledging node that failed to receive fewer than half the packets or some other selection criterion. The make-up set may include a union of the network packets that were not received by at least two of the acknowledging nodes, such as the two acknowledging nodes that received the largest number of network packets or the two acknowledging nodes that are furthest along the branch in the direction of the destination node. The broadcasting node N4 may limit the number of times it sends make-up packets.

Although network packets 702-706 (FIG. 7) were used in this example, some subset of the network packets 702-706 may be sent as a group during one time slot. The group of packets sent by the broadcasting node during one time slot need not be part or all of a larger message 700. The network packets in the group send during one time slot may be unrelated to each other, such as network packets that are not part of the larger message 700. In addition, other network packet numbering schemes may be used, as discussed with respect to FIG. 6. Thus, some or all of the network packets 602-606, and/or other network packets not shown in FIG. 6, may form the group of packets sent during one time slot.

In some embodiments, 32 network packets are sent during one time slot. In some embodiments, 2-32 network packets are sent during one time slot. Other numbers of network packets per time slot may be sent. It should be noted that no negotiation is conducted between a broadcasting network node and potential receiving network nodes, prior to broadcasting multiple network packets. Instead, the broadcasting network node merely broadcasts the multiple network packets, and then the broadcasting network node "fills in" the network packets missed by one or more receiving nodes.

Alternatively, in some embodiments, the broadcasting does not fill in the missing network packets. Instead, the broadcasting node merely passes the token to one of the receiving nodes, with respect to the network packets received by the receiving node. Then, the broadcasting node broadcasts the missing network packets as a new transaction.

It should be noted that according to conventional communication protocols, unicast and multicast messages typically require acknowledgment, but broadcast messages do not require acknowledgements. In contrast, embodiments of the present invention require acknowledgments of broadcast messages, which is not taught or suggested by the prior art.

Adjusting Node Clock Phase, Based on Received/Missed Packets

Each network node includes a clock that facilitates determining the beginning and end of the time slot (FIGS. 8 and 9) assigned to the network node, when to turn the node's wireless receiver on and off, as well as when to enter a power-saving sleep state and when to wake the node from the power-saving sleep state. Although separate clocks or other circuits may be used for these functions, for simplicity of explanation, all these clocks and circuits are collectively referred to herein as a single clock in each network node. The various network node clocks should be reasonably synchronized with each other, at least with other network nodes within radio range, and in some cases clocks in any base stations. However, partially due to the limited energy supply of each network node, the network node clocks are likely to drift, with respect to each other and with respect to the clock in the base station(s).

Prior art communication protocols that require synchronized clocks include methods for synchronizing clocks. However, these prior art methods require network traffic dedicated to clock synchronization and, therefore, consume power and bandwidth that is not used for communicating sensor commands or sensor data.

Embodiments of the present invention adjust clocks in network nodes to synchronize the clocks with clocks in other network nodes and/or clocks in base stations, without relying on dedicated clock synchronization communications. As discussed with respect to FIGS. 2 and 6-10, multiple network packets may be broadcast during a single time slot. Network nodes that receive any of the network packets may use information about timing of receipt of the network packets, relative to when the node turned on its radio receiver, together with information about how many network packets were broadcast, to synchronize their clocks with the broadcasting node's clock.

Figure 11:
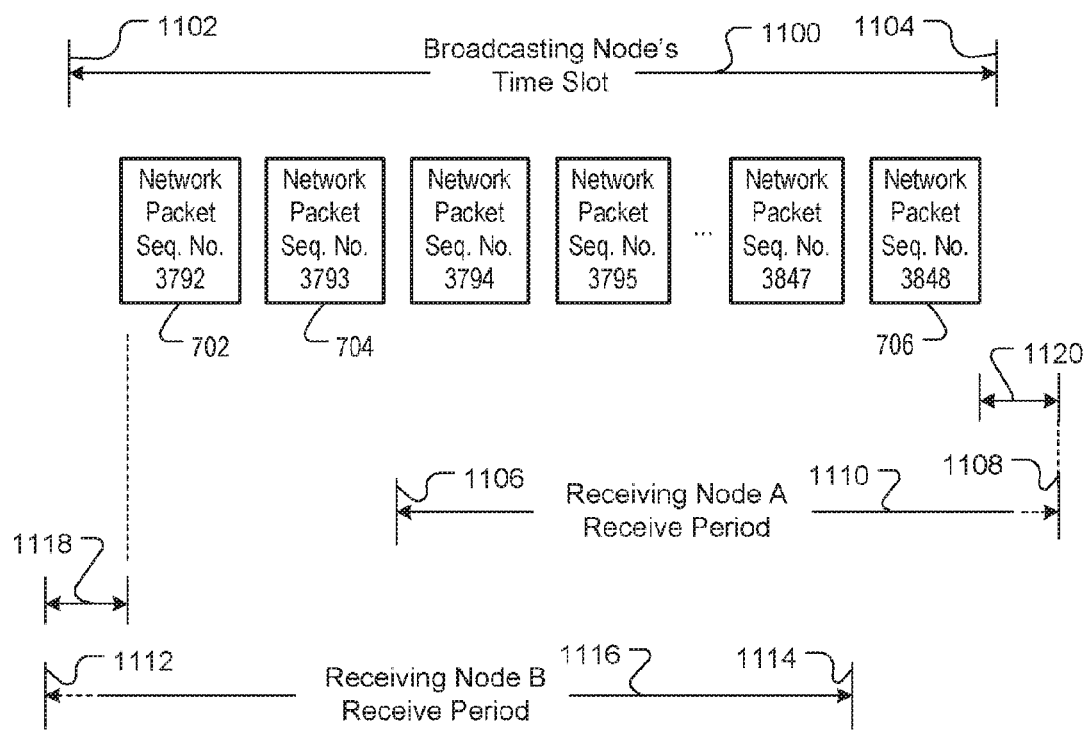
FIG. 11 schematically depicts a time slot during which network packets are broadcast, relative to times during which receiving nodes' receivers are on, as part of clock synchronization, according to an embodiment of the present invention.

FIG. 11 schematically depicts the time slot 1100 during which the network packets 702-706 of the example above are broadcast by network node N4. According to the broadcasting node's (N4) clock, the time slot 1100 begins at time 1102. Assuming a maximum number of network packets are broadcast, i.e., the time slot 1100 is full, according to the node N4 clock, the time slot ends at time 1104.

Recall that, to conserver power, each network node turns its radio receiver on at the beginning of a time period during which it expects other nodes to broadcast, or shortly therebefore, and the node turns its radio receiver off at the end of the expected broadcast period, or shortly thereafter. If a receiving node receives all the network packets 702-706, the receiving node's clock is reasonably synchronized with the broadcasting node's clock. However, if the receiving node turns its radio receiver on too late to receive the first one or more of the network packets 702, 703, etc., the receiving node's clock is behind, and therefore not synchronized with, the broadcasting node's clock (i.e., the receiver's clock is "slow"). Similarly, if the receiving node turns off its radio receiver before all the network packets of the group of network packets 702-706 are received, the receiving node's clock is ahead of, and therefore not synchronized with, the broadcasting node's clock (i.e., the receiver's clock is "fast").

As discussed with respect to FIGS. 6 and 7, each network packet contains information sufficient to enable a receiving network node to calculate how many network packets are in the series of network packets and the current network packet's position, relative to the beginning of the series of network packets. Based on the number of network packets a network node does not receive at the beginning of a series of network packets, the network node estimates by how much time the receiving network node's clock is slow, and the network node adjusts its clock by that amount of time. For example, if a hypothetical receiving node A clock causes the node A to turn its radio receiver on at time 1106 and off at time 1108, the node A receiving time period 1110 does not sufficiently match the broadcasting node's time slot 1100, consequently node A does not receive network packets 702 and 704. Node A calculates the number of missed network packets, i.e., two, and advances its slow clock by an amount of time sufficient to receive at least two network packets, thereby better synchronizing its clock with the broadcasting node's clock.

Similarly, based on the number of network packets a network node does not receive at the end of a series of network packets, the network node estimates by how much time the receiving network node's clock is fast, and the network node adjusts its clock by that amount of time. For example, if a hypothetical receiving node B clock causes the node B to turn its radio receiver on at time 1112 and off at time 1114, the node B receiving time period 1116 does not sufficiently match the broadcasting node's time slot 1100, and node B does not receive network packet 706. Node B calculates the number of missed network packets, i.e., one, and retards its fast clock by an amount of time sufficient to receive at least one network packet, thereby better synchronizing its clock with the broadcasting node's clock.

Optionally or alternatively, the receiving node B may measure or estimate an amount of time 1118 its receiver was on before the first network packets 702 was received and retard its clock by about the amount of time 1118. Similarly, optionally or alternatively, the receiving node A may measure or estimate an amount of time 1120 its receiver was on after the last network packets 706 was received and advance its clock by about the amount of time 1120.

Each network node maintains, including synchronizing, time slot timing information for each other network node, from which the network node is expected to receive a broadcast, i.e., its expected or possible neighbors. As noted, in some contexts, each network node is expected to have about three neighbor nodes on the same branch in each direction. Thus, in these contexts, each network node is expected to receive broadcasts from about six other network nodes. Consequently, each network node should be able to maintain time slot timing information about six other nodes. Network nodes that are members of more than one branch should maintain time slot timing information about six other nodes per branch.

Automatic Identification of Nearby Nodes and Clock Synchronization

Figure 17:
FIG. 17 is a schematic block diagram of several hypothetical nodes of a linear network, according to embodiments of the present invention.
Figure 18A:
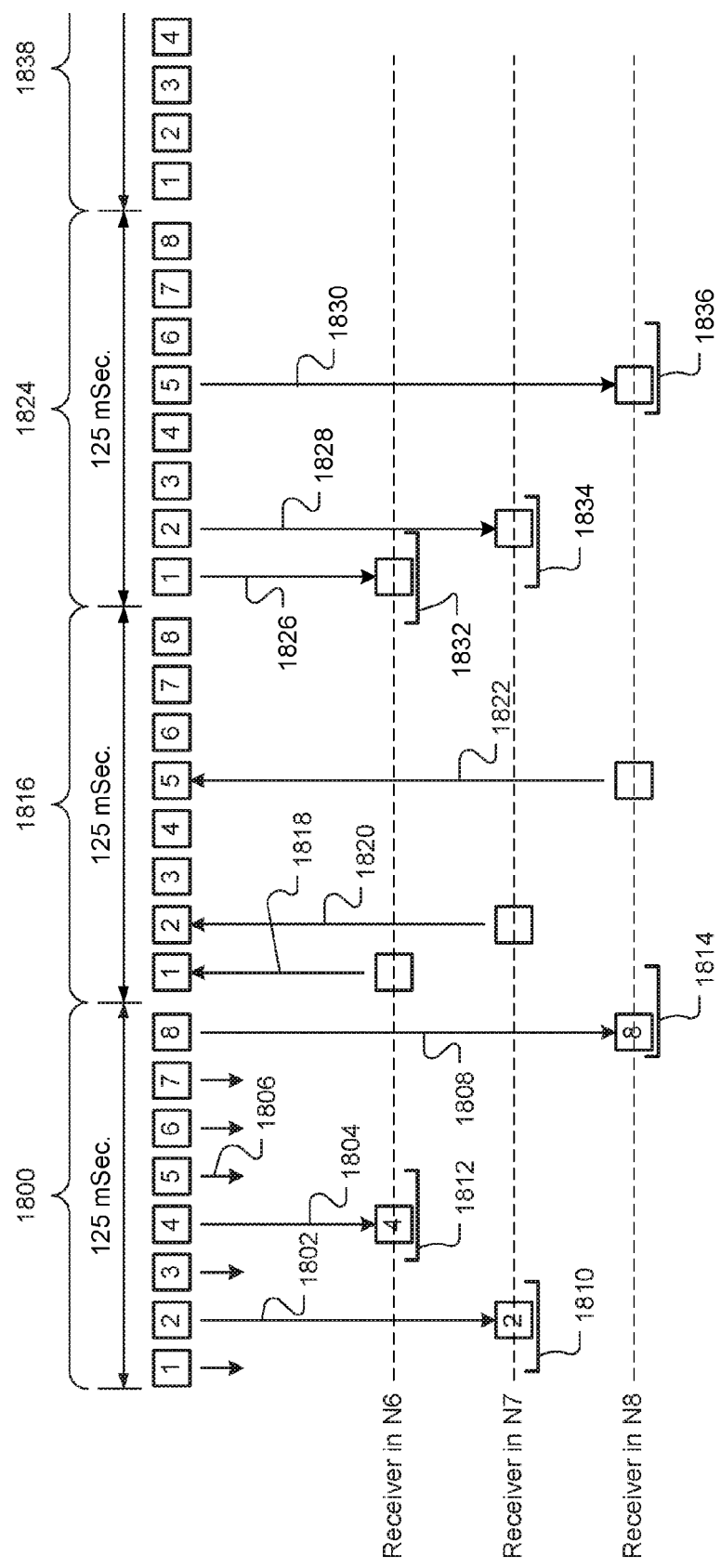
FIGS. 18A and 18B is a timing diagram schematically illustrating a four-phase synchronization protocol, as may be used by the nodes of FIG. 17, according to an embodiment of the present invention.
Figure 18B:
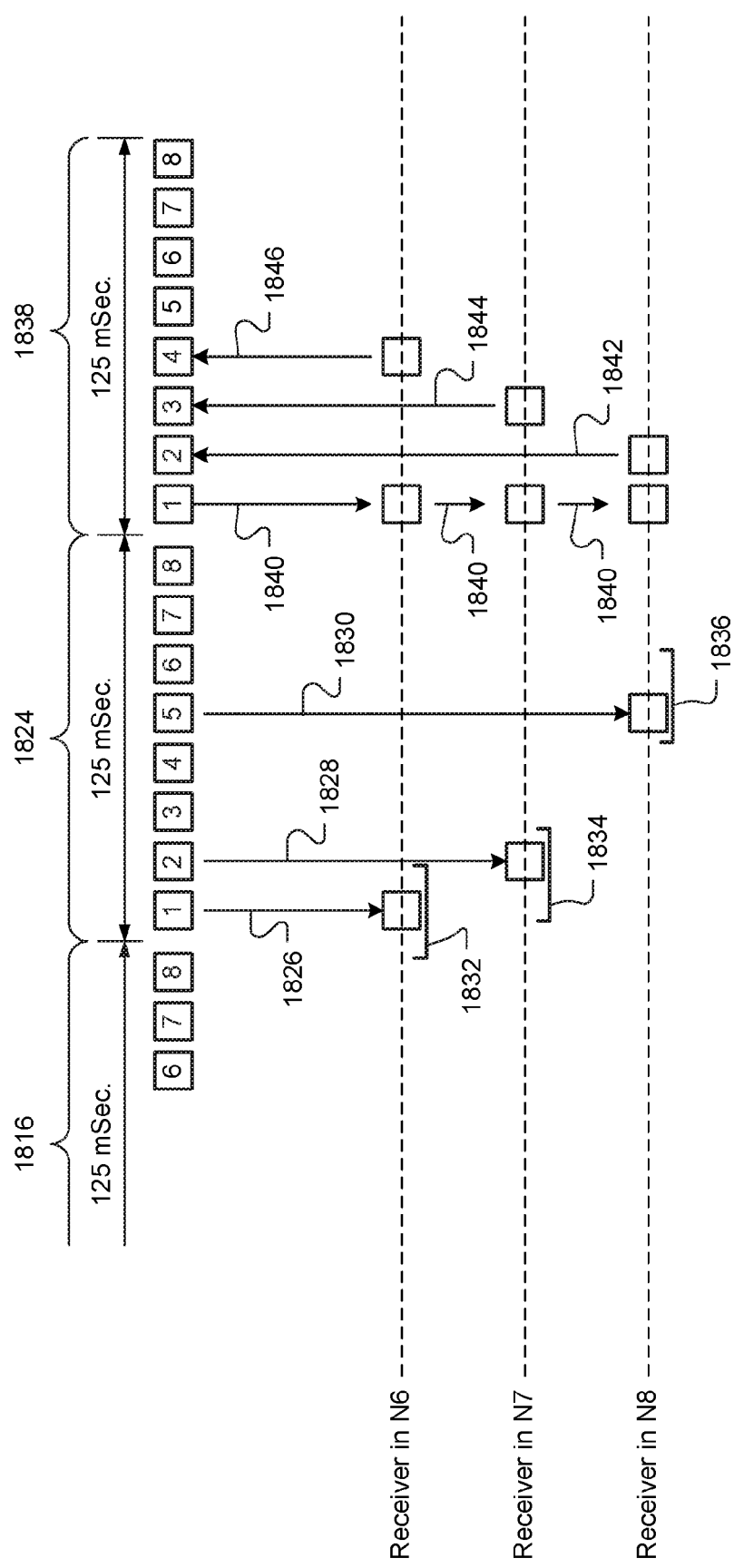

Optionally or alternatively, nodes of a linear network may synchronize their respective clocks by exchanging messages for this purpose. A four-phase clock synchronization protocol is described, with reference to FIGS. 17, 18 and 19. FIG. 18 is divided between two sheets (FIGS. 18A and 18B). As noted, each node has a relatively small number of neighbors, typically about six, and each node periodically wakes in anticipation of receiving transmissions from its neighbors. Synchronized clocks facilitate these communications. Network traffic flowing in one direction along a branch, such as away from a base station, is handled separately from network traffic flowing in the other direction. Consequently, a node may maintain synchronization with its neighbors on one side of the node separately from synchronization with its neighbors on the other side. Furthermore, synchronized clocks facilitate nodes entering, and waking from, power-saver sleep states in synchrony with their neighbors, in time to receive broadcasts from its neighbors, in time to collect data with its sensor, etc.

Assume for purposes of explanation that node N5 (FIG. 27) is in wireless communication range of nodes N6, N7 and N8 on one side, but that node N5 either has not yet discovered nodes N6-N8 or node N5 needs to confirm its ability to wirelessly communicate directly with these nodes N6-N8. In discovering or confirming its neighbors on one side, node N5 transmits packets that enable its neighbors on that side to synchronize their respective clocks with the clock of node N5, according to the four-phase clock synchronization protocol. Node N5 is, of course, representative. Each node of a linear network may periodically or occasionally follow the protocol to synchronize its upstream or downstream neighbors' clocks to the node's clock.

FIG. 18 is a schematic timing diagram, with time progressing to the right, showing a hypothetical set of communications among the nodes N5-N8, according to the four-phase clock synchronization protocol. Assume the nodes N5-N8 operate on a 125 millisecond (msec.) wake-up cycle, although other wake-up cycle times may be used. During a first phase 1800, node N5 transmits a set of time spaced-apart synchronization packets. Each synchronization packet is transmitted during a corresponding time slot 1-8. The eight transmissions are indicated by vertical arrows, represented by arrows 1802, 1804, 1806 and 1808.

Each synchronization message 1802-1808 contains an indicator of which side of the transmitting node N5 is being synchronized. For example, the indicator may include the node identifier of node N5 and an indication that nodes having larger node identifiers, i.e., upstream nodes, are being synchronized. Recall that node identifiers are assigned to nodes, such that the node identifiers monotonically vary along a branch.

In the example of FIG. 18, eight time slots 1-8 are shown per 125 msec. cycle; however, other numbers of time slots may be used. Each time slot 1-8 is assigned to a single potential respective receiving node. The example of FIG. 18 shows more time slots 1-8 than nodes N6-N8 that receive the transmissions. Thus, the time slots 1-8 could accommodate additional nodes, such as nodes N9 and N10 (FIG. 17), if these nodes were within wireless communication range of node N5. As noted, during other times, such as nighttime, more nodes may be within wireless communication range of node N5. Thus, the number of time slots 1-8 need not equal the number of nodes N6-N8 that receive the synchronization packet transmissions 1802-1808.

The synchronization messages 1802-1808 contain information that identifies the time slots 1-8 and indicates which nodes are assigned to which time slots. For example, time slots may be assigned to nodes N9 and N10, in case these nodes are within wireless communication range. The order of the time slots need not correlate to the order of the node identifiers assigned to the potential receiving nodes.

Times during which respective wireless receivers in nodes N6, N7 and N8 are on are indicated by bars 1810, 1812 and 1814. Note that the "on" times 1810-1814 may not be well aligned with times at which the synchronization packets are transmitted 1802-1808, indicating that the clocks in nodes N6-N8 are not well synchronized with the clock in node N5.

Assume each of nodes N6-N8 receives at least one of the eight synchronization packet transmissions 1802-1808 directly from the transmitting node N5, i.e., without the synchronization packet(s) being forwarding by any other node. In this example, no other node, such as node N9, on the same side of node N5 receives any of the synchronization packet transmissions 1802-1808. One or more other nodes, such as node N4, on the other side of the transmitting node N5 may receive one or more of the synchronization packet transmissions 1802-1808, but they ignore these transmissions, because they are intended for nodes on the other side of node N5. The term "node that receives a synchronization packet transmission" does not include these other nodes.

Each node N6-N8 that receives a synchronization packet transmission 1802-1808 identifies which of the time slots is assigned to the node. Recall that the eight time slots are assigned to eight potential receiving nodes, and information about the assignments is included in the synchronization packets. Assume that node N6 is assigned time slot 1, node N7 is assigned time slot 2 and node N8 is assigned time slot 5.

In response to receiving the synchronization packet transmission(s), during the second phase 1816, each node N6-N8 wirelessly transmits an acknowledgement packet, as indicated by arrows 1818, 1820 and 1822, during its assigned time slot. Each acknowledgement message includes the node identifier of the respective transmitting node. Thus, the nodes N6, N7 and N8 collectively transmitting a plurality of transmitted acknowledgement messages 1818-1822.

Assume the synchronizing node N5 receives at least one of the acknowledgement messages 1818-1822. The synchronizing node N5 prioritizes a set of the nodes N6-N8 whose acknowledgement messages were received. The prioritization is based at least in part on the network node identifiers of the nodes whose acknowledgement messages were received by the synchronizing node N5. The priorities are assigned based on distance from the synchronizing node N5, with higher priorities being assigned to more distant nodes. Note that a measure of the distance from the synchronizing node N5 may be determined by calculating a difference between the node identifier of the synchronizing node N5 and the node identifier of an acknowledging node N6-N8. This scheme favors forwarding messages to most distant nodes, therefore making network hops as large as possible.

Because the node identifiers are monotonically assigned, the synchronizing node N5 can assume the node N8 with the largest node identifier, among the nodes N6-N8 that send acknowledgement messages 1818-1822, is furthest along the branch, i.e., furthest from the synchronizing node N5. The synchronizing node N5 therefore assigns the highest priority to node N8, the next highest priority to the next most distant node N7, etc. If the synchronizing node N5 were synchronizing clocks in nodes on the other side, or if the node identifiers decrease in a direction from node N5 to node N8, the priority assignment would be based on the smallest node identifier, rather than the largest node identifier.

During the third phase 1824, the synchronizing node N5 transmits prioritizing packets to at least one of the nodes N6-N8 that were prioritized, as indicated by arrows 1826, 1828 and 1830. The prioritizing packets are transmitted during the respective time slots (1, 2 and 5) assigned to the intended receiving nodes N6-N8. Times during which respective wireless receivers in nodes N6, N7 and N8 are on are indicated by bars 1832, 1834 and 1836.

As a result of receiving transmissions from the synchronizing node N5 during either the first phase 1800 or the third phase 1824, each receiving node N6-N8 adjusts its clock based on when, during the node's receiver "on" time 1810-1814 or 1832-1836, the transmission from the synchronizing node N5 is received. For example, and along the lines discussed with respect to FIG. 11, if the transmission from the synchronizing node N5 is received near the beginning of the receiver "on" time 1810-1814 or 1832-1836, the receiving node N6-N8 may consider its clock to be slow (late) and adjust its clock so as to turn its receiver on earlier. As a result, future transmissions from the synchronizing node N5 should be received closer to the middle of the receiving node's "on" time 1810-1814 or 1832-1836.

Optionally, during the fourth phase 1838, the synchronizing node N5 transmits a request to confirm synchronization message 1840. Nodes N6-N8 that receive the request to confirm synchronization message 1840 acknowledge receipt by transmitting respective acknowledgement packets, as indicated by arrows 1842, 1844 and 1846. The nodes N6-N8 transmit their respective acknowledgement packets in priority order. The synchronizing node N5 receives the acknowledgement packets and maintains a list of synchronized nodes N6-N8, including their respective priorities.

Figure 19:
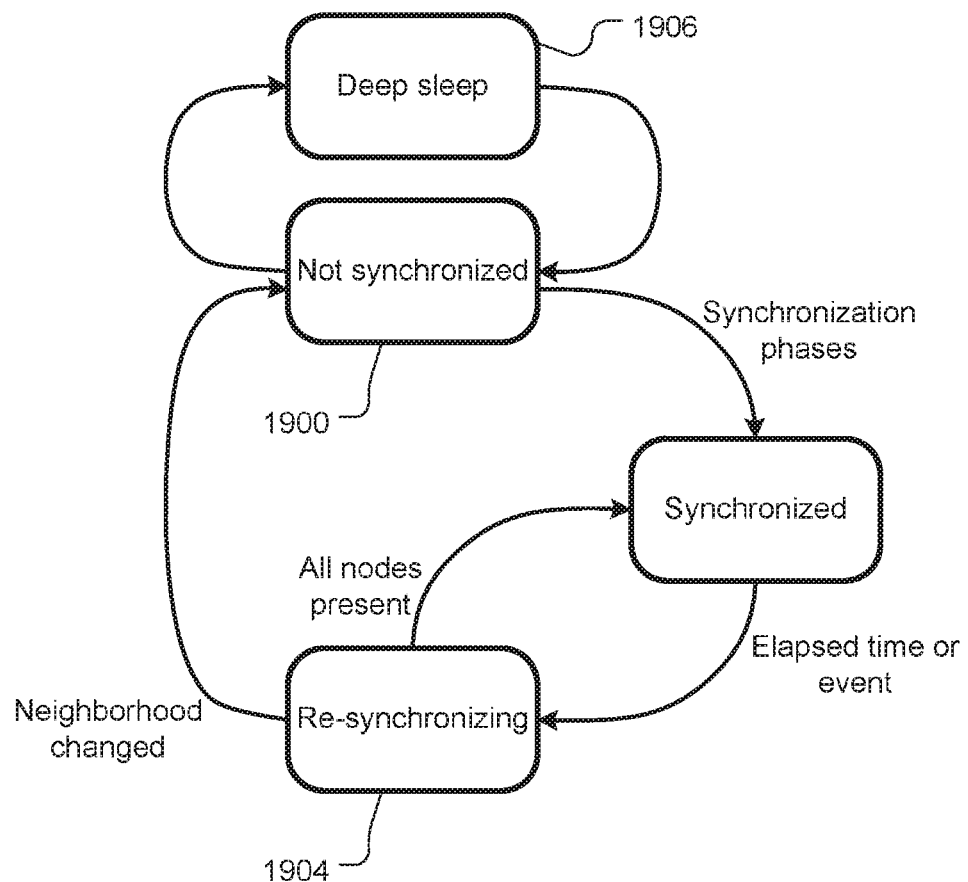
FIG. 19 is a state diagram schematically illustrating states of a node and state transitions of the four-phase synchronization protocol, according to an embodiment of the present invention.

A state diagram, shown schematically in FIG. 19, illustrates synchronization states of the nodes N5-N8 and transitions among the states. As noted, each node maintains separate clock information relative to each neighbor. Thus, each node maintains a separate synchronization state for each neighbor from which it expects to receive transmissions. The following describes how each such synchronization state is maintained for one neighbor.

Upon startup, each node enters a "not synchronized" state 1900. Once a node, such as one of the nodes N6-N8, is synchronized with its neighbor, such as node N5 as discussed above, the node N5 enters a "synchronized" state 1902, with respect to the nodes (N6-N8) with which it has synchronized. The node N5 may remain in the synchronized state 1902 for a predetermined amount of time or until an event occurs that should cause the node to re-synchronize its clock. The synchronizing node (such as node N5) may periodically or occasionally send relatively small synchronizing packets, so its neighbors can maintain their respective clocks in synchrony with the synchronizing node's clock. However, if a node does not receive a synchronizing packet for a predetermined amount of time, the node enters a "re-synchronizing" state 1904. If a node detects a change in its neighborhood, i.e., more of fewer nodes are neighbors, the node enters the not synchronized state 1900 to establish new synchronizations and priorities.

Periodically or occasionally, the node enters a "deep sleep" state 1906, in which it enters a power-saving mode for a relatively long period of time. During deep sleep, the node's transmitter and receiver remain off, to conserve power. The duration of the deep sleep may be predetermined, based on considerations, such as charge level of the node's battery and/or number of nodes in the network and/or in this node's branch. These considerations may be relevant to meeting a design objective, such as enabling the network to transfer a desired number of commands and/or data between one end of each branch and the other end of each branch within a prescribed amount of time, such as one day.

Over-the-Air Provisioning with Scheduled Implementation

Over the lifetime of network nodes of a sensor network, it may be desirable or necessary to occasionally update parameters, such as network node identifiers, power-saving sleep intervals, time slot allocations, start/stop times to collect sensor data or the like, and/or software in the network nodes. It is often desirable or necessary to implement such changes on all network nodes simultaneously or within a predetermined widow of time, such as to maintain consistency of network node identifiers among the network nodes. However, especially on networks with long branches, times required to forward network packets from one end of a branch to the other end of the branch may be too large to affect the change on all impacted nodes simultaneously or within a desired window of time.

Embodiments of the present invention solve this problem by distributing messages to the impacted network nodes or merely flooding the entire network or branch with messages. Each message includes update information, such as new software, an updated network node identifier or instructions how to recalculate a node's identifier, and an indication of a future time, at which the change should be implemented by the node. Each message may include a script to be executed by each impacted node. These messages may be sent by a base station or any other suitable source of update commands. The message sender may send redundant copies of the messages to each of the impacted nodes, in case some of the messages are dropped.

Each impacted node receives at least one of the messages destined to the impacted node and stores the update information contained in the message. Each impacted node sets an internal timer or uses another suitable mechanism to be notified at or before the future time, including being awoken from a power-saver sleep state, if necessary. When the network node is notified that the future time is present, the network node makes the change, i.e., updates itself, using the stored update information.

In some cases, only certain network nodes should be updated. For example, only network nodes containing certain hardware components or a certain version of a hardware component or executing a certain version of software, or an earlier version of the software, should be updated. In these cases, each message may include an indication of a type of update, and each node checks the type of update to determine whether the update applies to the node. If the node conforms to the type of update, the node implements the update as described above. Optionally or alternatively, each node stores the update information only if the node conforms to the type of update.

Health and Welfare Information Piggybacking on Other Network Traffic

In many situations, it is desirable or necessary to obtain network node health and welfare information from network nodes, such as sensor status, batter charge level, energy harvester production, wireless signal-to-noise ratio, number of other nodes within wireless radio range, effective bandwidth to neighboring nodes and the like. However, as noted, it is desirable or necessary to conserve electrical power and network bandwidth.

Figure 12:
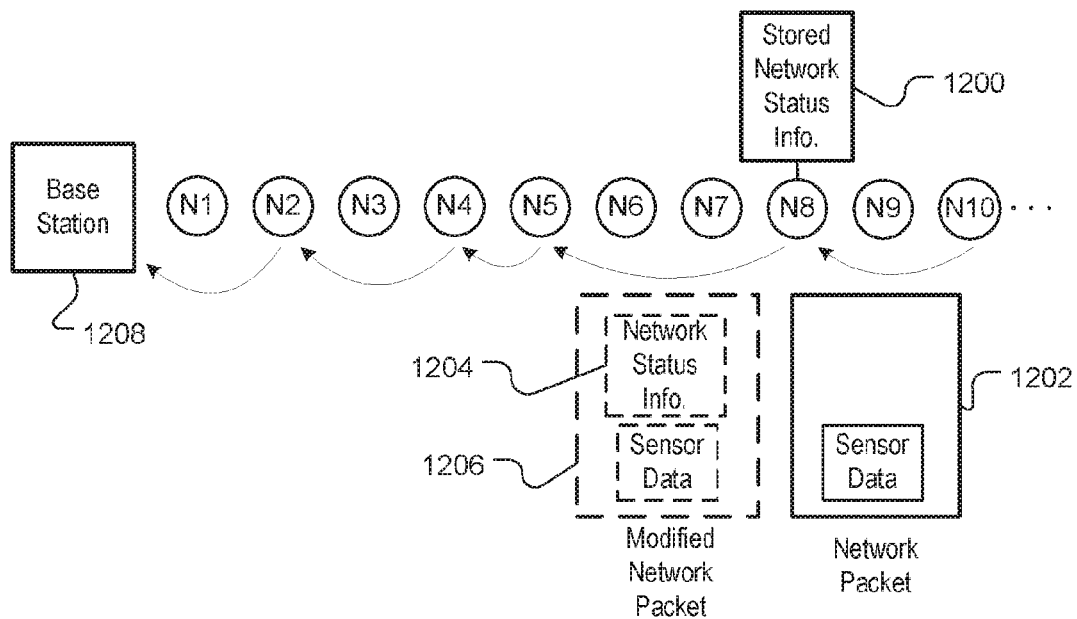
FIG. 12 is a schematic block diagram, similar to FIG. 2, illustrating how network status information is sent by "piggybacking" on a sensor data network packet, according to an embodiment of the present invention.

To avoid sending separate health and welfare network packets (hereinafter referred to simply as network status information), some embodiments include this kind of information in network packets that carry commands and/or data. FIG. 12 schematically depicts a hypothetical exemplary scenario according to such an embodiment. A node N8 collects and stores network status information 1200 until the node receives a network packet 1202 being forwarded in a direction in which the network status information 1200 should be sent and which has sufficient free space to contain some or all of the network status information 1200. The node N8 stores the network status information 1204, or a portion thereof, in the network packet, thereby producing a modified network packet 1206. The node N8 then broadcasts the modified network packet 1206, to forward the modified network packet 1206 on its route.

Once the modified network packet 1206 arrives at its destination, such as at a base station 1208, if the network status information 1204 is destined to the same destination, the network status information 1204 is delivered. Otherwise, the network status information 1204 may be stored by the receiving node until another network packet suitable for transporting the network status information 1204 further along its route is received.

In some embodiments, the transporting network packets carry sensor commands and/or sensor data and are not network packets created specifically for carrying network status information. Such network packets are, therefore, devoid of any network status information before a node adds stored network status information to the packet, as described herein.

Network packets necessarily have limited space, sometimes no space, for network status information. In some cases, two or more network nodes on a branch concurrently have network status information to send, but space available in a network packet may be insufficient to accommodate all, or in some cases more than one, of the nodes. Some embodiments prioritize transportation of network status information, such as based on significance of the network status information, according to a predetermined, even arbitrary, comparison scheme.

For example, one node's network status information may contain routine historical information, such as a number of samples taken to date by the node's sensor, whereas another node's network status information may indicate the node's battery charge is critically low. The historical information may be deemed less significant than the battery status information.

In some embodiments, as a network packet carrying network status information transits a network node, if the network node stores network status information to be sent in the same direction as the network packet is begin forwarded, and the network status information stored by the transit node is more significant, according to a predetermined comparison scheme, than the network status information currently in the network packet, the transit node stores its network status information in the network packet, displacing, if necessary, the network status information currently in the network packet.

Network Branches

Figure 13:
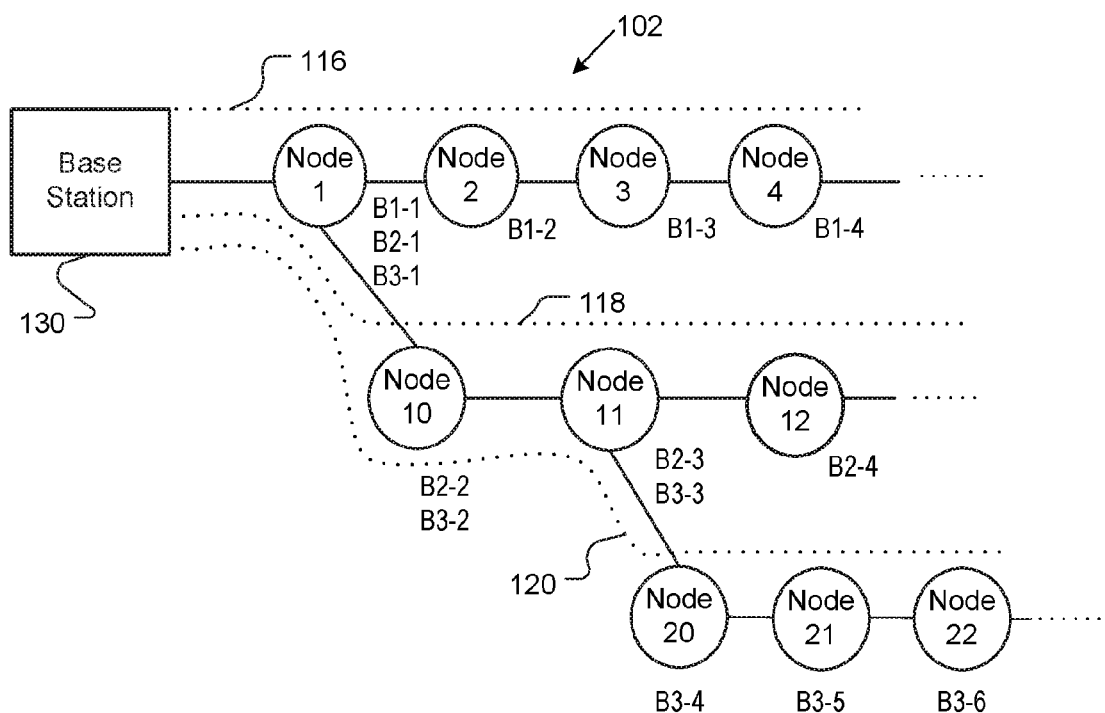
FIG. 13 is a schematic block diagram of one of the hypothetical linear networks of FIG. 1, showing network node identifiers, according to an embodiment of the present invention.

As noted with respect to FIG. 1, a linear network includes one or more branches. Network nodes that are common between or among multiple branches have multiple network node identifiers, one for each branch. FIG. 13 illustrates an exemplary hypothetical network node identifier scheme for linear network 102 of FIG. 1. As noted, the linear network 102 includes three branches 116, 118 and 120.

All being members of branch 116, nodes 1, 2, 3, 4, etc. are assigned network identifiers that include an indication of their branch. For example, node 1 is assigned network identifier B1-1, node 2 is assigned network identifier B1-2, etc., where B1 signifies the branch 116. According to this scheme, nodes 1, 2, 3, 4, etc. are assigned network node identifiers that increase monotonically along the branch 116, in a direction away from the base node 130, from one end of the branch 116 to the other end of the branch 116.

All being members of branch 118, nodes 1, 10, 11, 12, etc. are assigned network identifiers that include an indication of their branch. For example, node 1 is assigned network identifier B2-1, node 10 is assigned network identifier B2-2, node 11 is assigned network identifier B2-3, etc., where B2 signifies the branch 118. According to this scheme, nodes 1, 10, 11, 12, etc. are assigned network node identifiers that increase monotonically along the branch 118, in a direction away from the base node 130, from one end of the branch 118 to the other end of the branch 118.

All being members of branch 120, nodes 1, 10, 11, 20, 21, 22, etc. are assigned network identifiers that include an indication of their branch. For example, node 1 is assigned network identifier B3-1, node 10 is assigned network identifier B3-2, node 11 is assigned network identifier B3-3, node 20 is assigned network identifier B3-4, node 21 is assigned network identifier B3-5, etc., where B3 signifies the branch 120. According to this scheme, nodes 1, 10, 11, 20, 21, 22, etc. are assigned network node identifiers that increase monotonically along the branch 120, in a direction away from the base node 130, from one end of the branch 120 to the other end of the branch 120.

Note that nodes 1, 10 and 11 have multiple network identifiers. As noted, each network node stores a representation of its respective network node identifier, such as in a memory. When these nodes receive network packets and perform network packet routing, as discussed with reference to FIGS. 4 and 5, the nodes use the stored representations of their respective network node identifiers that are associated with the branch, over which the network packets are received. The branch, over which a given network packet is received, can be identified by the network node identifier, such as the B1, B2 or B3 portion of the network node identifier, of the node that broadcast the network packet. Each network node that is a member of more than one branch may maintain information about each such branch. The information may include network identifiers of neighboring nodes on the branch that are within radio communication range.

Network Segmentation to Increase Network Size, While Reducing Power Consumption

As discussed, low duty cycle wireless communication protocols are used to conserve electrical power largely by keeping network nodes in power-saver sleeps state most of the time. However, if network nodes are required to transfer data they collect to a base station within a predetermined amount of time, such as 24 hours, or commands from the base station need to be delivered to their destination network nodes within a predetermined amount of time, the length (in number of nodes) of each network branch is limited by the number of hops that can occur within the predetermined amount of time. Conventional low duty cycle wireless communication protocols, such as the ContikiMAC radio duty cycling protocol, can support only a relatively small number of nodes in a network branch, because the total amount of time the nodes are awake and able to receive and send network packets from and to other nodes limits the number of hops that can occur during a given time period, such as 24 hours.

Embodiments of the present invention improve on conventional low duty cycle wireless communication protocols by dividing a given linear sensor network into two or more network segments and associating each network segment with a distinct time slot. As a result, communications may occur in parallel in multiple network segments, without one network segment's communications interfering with communications on another network segment. This is particularly important in an area proximate the base station, where nodes of several network segments may be within radio range of each other.

Figure 14:
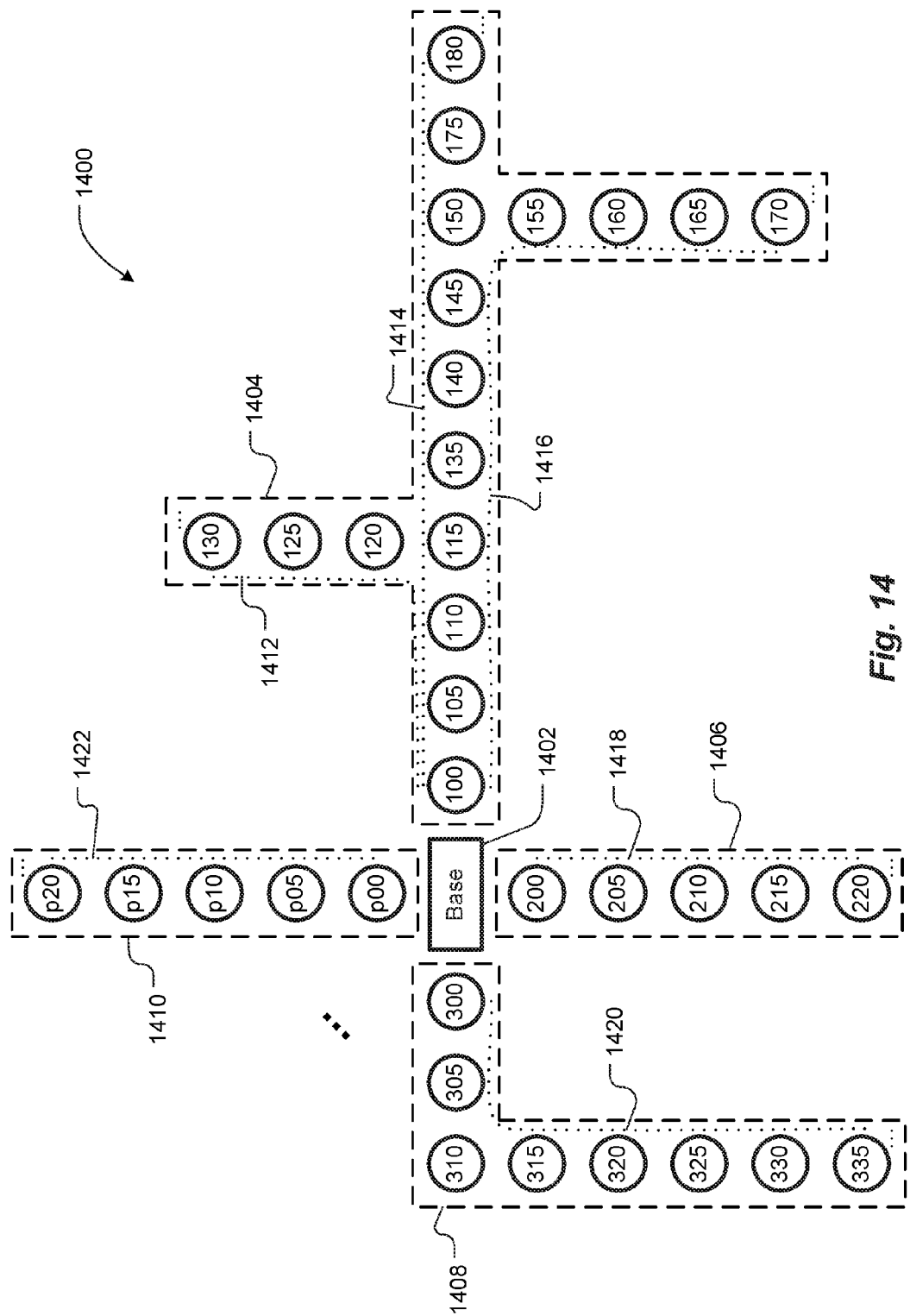
FIG. 14 is a schematic block diagram of a hypothetical linear network that includes several network segments and several branches, according to an embodiment of the present invention.

FIG. 14 is a schematic block diagram of a hypothetical wireless sensor network 1400 having a base station 1402 and "p" network segments (four shown) 1404, 1406, 1408 and 1410. As used herein, a network segment includes all network nodes that can send and receive network packets to and from each other, directly or via only other network nodes of the same network segment, without passing through a base station or a network node of another network segment. The base station may be considered part of each network segment. However if, in order to route a network packet, the base station must receive the network packet from a first network node and then send the network packet to another network node, the other network node is not on the same network segment as the first network node.

Each network segment includes at least one network branch. For example, network segment 1404 includes three network branches 1412, 1414 and 1416. Each of the other three shown network branches 1406-1410 includes only one network branch 1418, 1420 and 1422, respectively.

Figure 15:
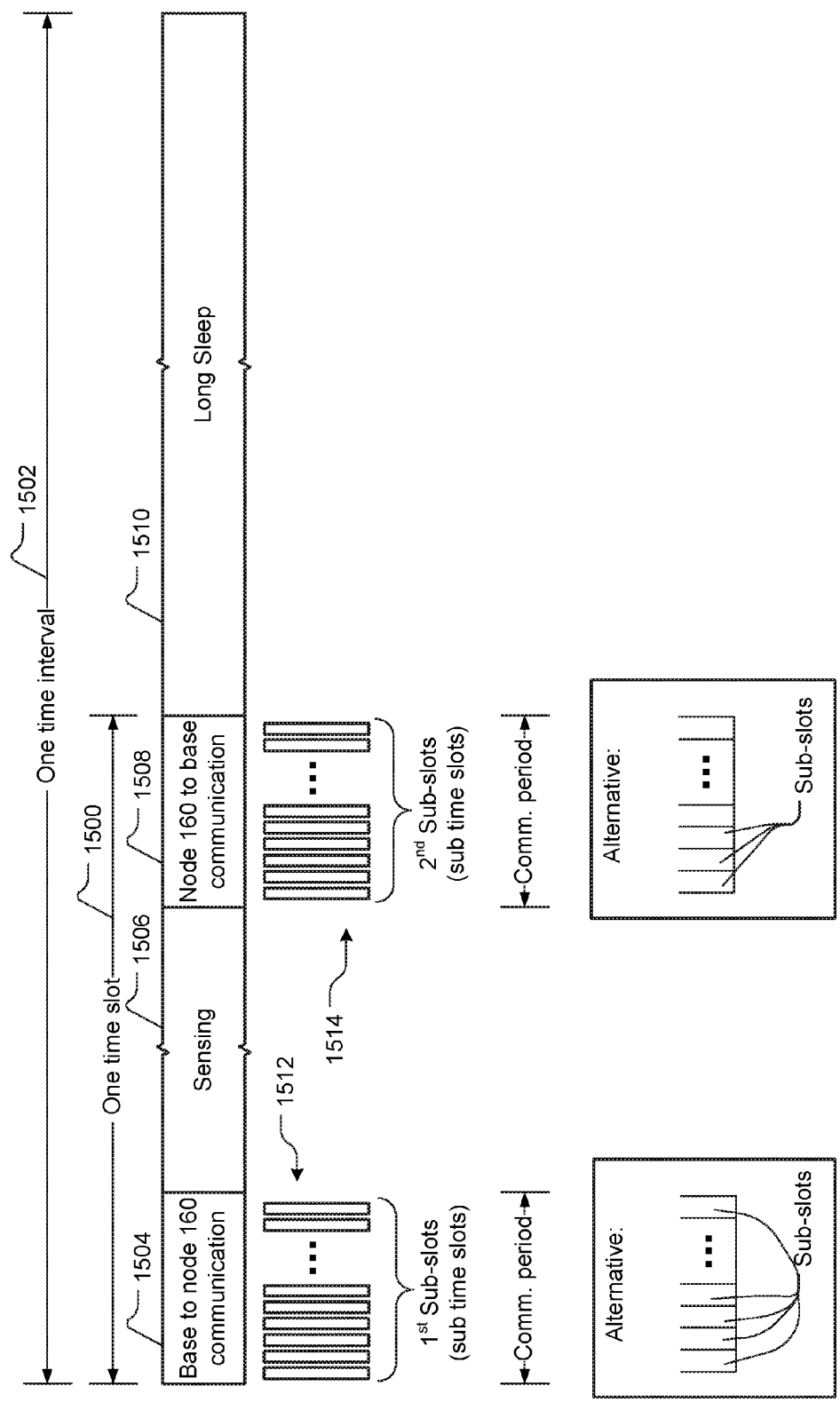
FIG. 15 is a schematic timing diagram illustrating hypothetical time intervals, time slots and time sub-slots, according to embodiments of the present invention.

According to embodiments of the present invention, each network segment 1404-1410 is assigned a distinct time slot during which network nodes of the network segment may broadcast. Although network nodes, such as network nodes 100, 105, 110, 200, 205, 300, 305, 310, p00 and p05, near the base station end of each network segment may be within radio range of each other, their broadcasts do not interfere with broadcasts by network nodes in each other's network segments, because when network nodes of one network segment broadcast, radio receivers of network nodes in other network segments near the base station 1402 are off Each network segment's time slot marks the beginning of a longer time period referred to as a "time interval." Exemplary hypothetical time interval 1502 and time slot 1500 for network segment 1404 (FIG. 14) are schematically illustrated in FIG. 15. Each time slot 1500 is divided into three time periods 1504, 1506 and 1508. A remainder of the time interval 1502 is referred to as a long sleep period 1510. The first time period 1504 is subdivided into a plurality of first sub-slots (sub time slots) 1512, and the third time period 1508 is subdivided into a plurality of second sub-slots (sub time slots) 1514. As shown in FIG. 15, each sub-slot 1512 and 1514 may be time-spaced apart from its adjacent sub-slot(s) or, alternatively as shown lower in FIG. 15, the sub-slots may be contiguous.

During each of the first sub-slots 1512, network nodes of the network segment 1404 may broadcast for the purpose of forwarding network packets in a direction away from the base station 1402, and during each of the second sub-slots 1514, network nodes of the network segment 1404 may broadcast for the purpose of forwarding network packets in a direction toward the base station 1402.

During the second time period 1506, the network nodes of the network segment 1404 may operate their respective sensors to sense data and store sensed data. The network nodes may operate continuously during the second period 1506, or they may periodically or occasionally enter power-saving sleep states. If respective ones of the network nodes of the network segment 1404 are not assigned to collect data during a given time period, the nodes may enter a power-saver sleep state during the second time period 1506. During the long sleep period 1510, the nodes of the network segment 1404 enter power-saver sleep states.

Note that FIG. 15 is not drawn to scale. The long sleep time period 1510 is much longer than the time slot 1500. Consequently, the nodes of the network segment 1404 are in power-saver sleep states over 99% of the time. According to embodiments of the present invention, the nodes of the network segment 1404 are in power-saver sleep states a greater fraction of the time than in prior art low power radio duty cycling protocols. As a result, the nodes of the network segment 1404 have power available to wake more frequently during the first and second time periods 1504 and 1508 than in prior art low power radio duty cycling protocols. Being able to wake more frequently enables the nodes of the network segment 1404 to handle more hops over the course of a given time period, such as 24 hours, than is possible using prior art low power radio duty cycling protocols. Consequently, these embodiments of the present invention can support longer (in terms of numbers of network nodes) branches than prior art low power radio duty cycling protocols.

Figure 16:
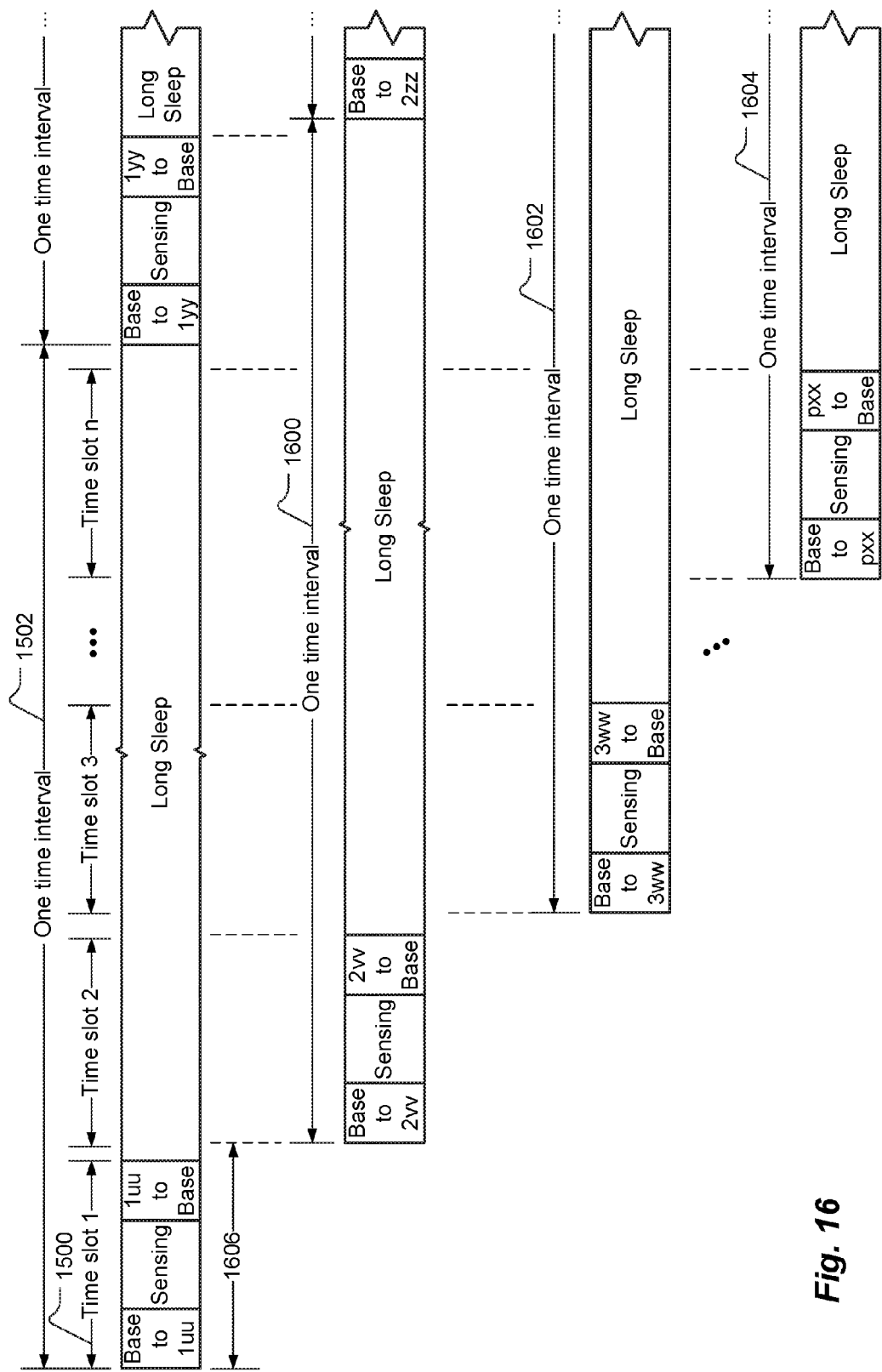
FIG. 16 is a schematic timing diagram illustrating operation of the linear network of FIG. 14, according to the timing diagram of FIG. 15, according to embodiments of the present invention.

FIG. 16 is a schematic diagram illustrating hypothetical timings of time intervals for respective network segments 1404-1410 (FIG. 14). As can be seen in FIG. 16, start times of time intervals 1502, 1600, 1602, . . . , 1604 are staggered, so as to prevent broadcasts by network nodes of one network segment interfering with broadcasts by network nodes of any other network segment. For example, duration 1606 of the stagger is at least as long as a time slot, such as Time slot 1 1500. The time intervals 1502-1604 repeat.

In an embodiment, the time slots, time intervals and sub-slots are selected to enable a linear network of at least 1,000,000 network nodes to forward at least one command network packet from the base station to the last network node on each branch, and to forward at least one sensor data packet from the last network node on each branch to the base station, all within a 24-hour period. Such a network is likely to require a relatively large number of branches, in some cases about 1,000 branches.

Methods and apparatus, as described herein, may simultaneously operate at multiple radio frequencies (channels) to increase bandwidth.

IEEE 802.15.4 is a standard that specifies physical layer and media access control (MAC) for low-rate wireless personal area networks (LR-WPANs). IEEE 802.15.4 is the basis for the ZigBee, ISA100.11a, WirelessHART and MiWi specifications, each of which further extends the standard by developing upper layers, which are not defined in IEEE 802.15.4. Alternatively, IEEE 802.15.4 can be used with the 6LoWPAN protocol and standard internet protocols to build a wireless embedded internet. 6LoWPAN enables the transmission of IPv6 packets over wireless sensor networks based on the IEEE 802.15.4 standard. 6LoWPAN defines encapsulation and header compression mechanisms that allow IPv6 packets to be sent to, and received from, IEEE 802.15.4 based networks. IPv4 and IPv6 are regularly used for data delivery over local area networks, metropolitan area networks and wide-area networks, such as the Internet. Likewise, IEEE 802.15.4 devices can provide sensing communication capabilities in wireless domains. Embodiments of the present invention augment and/or modify aspects of 6LoWPAN and other protocols.

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Accordingly, the invention should not be viewed as being limited to the disclosed embodiments.

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof.

Figure 20:
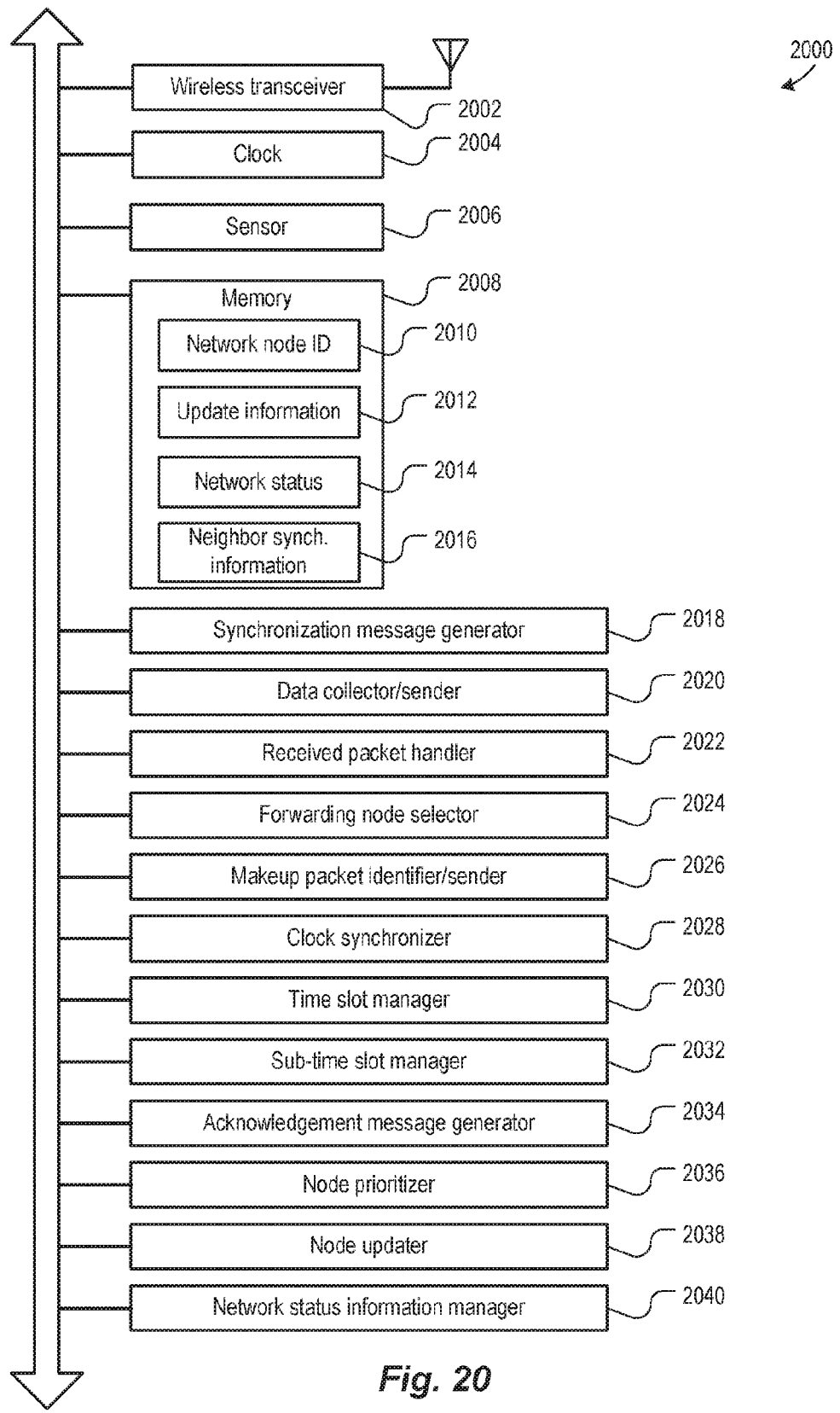
FIG. 20 is a schematic block diagram of a network node, according to an embodiment of the present invention.

FIG. 20 is a schematic block diagram of a network node 2000, according to an embodiment of the present invention. The node 2000 includes a wireless transceiver 2004, a clock 2004, at least one sensor 2006 and a memory 2008, as discussed herein. The memory 2008 may be used to store information, such as a network node identifier 2010 of the node 2000, node update information 2012, network status information 2014 and neighbor synchronization information 2016. The network node 2000 also includes a synchronization message generator 2018 that generates synchronization messages, as discussed with respect to FIG. 18. A data collector/sender 2020 handles the sensor 2006, stores data collected from the sensor 2006 as needed, and sends all or some of the collected data, such as toward a base station.

A received packet handler 2024 handles tasks, such as forwarding network packets, as discussed herein, including fragmenting large packets as needed. A forwarding node selector 2024 selects a node to forward packets to, such as described with respect to FIGS. 2-5. A make-up packet identifier/sender 2026 identifies make-up packets that should be sent to other nodes and sends the make-up packets, such as described with respect to FIG. 10.

A clock synchronizer 2028 adjusts the clock 2004, as necessary to maintain synchrony with other nodes, such as described with respect to FIGS. 11 and 18-19. The clock synchronizer 2028 may also maintain synchronization status information about neighbor nodes. A time slot manager 2030 and a sub-time slot manager 2032 control when the node 2000 transmits and receives, as discussed with respect to FIGS. 15, 16 and 18. An acknowledgement message generator 2034 generates acknowledgement messages, such as those sent after receiving a last sequential packet, to indicate which nodes have received a broadcast and for synchronizing clocks.

A node prioritizer 2036 prioritizes nodes, such as discussed with respect to FIG. 18. A node updater 2038 handles node updates, such as by storing the update information 2012 in the memory 2008 and applying the update information 2012 when triggered by the clock 2004. A network status information manager 2040 handles forwarding network status information along a branch.

Embodiments may be implemented by a processor executing, or controlled by, instructions stored in a memory. The memory may be random access memory (RAM), read-only memory (ROM), flash memory or any other memory, or combination thereof, suitable for storing control software or other instructions and data.

Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

What is claimed is:

1. A linear sensor network, comprising:
a plurality of network nodes forming, and being members of, a plurality of partially overlapping branches, each branch of the plurality of branches having a respective first end and a respective second end, the plurality of branches having a common root, at least one network node of the plurality of network nodes being a member of at least two branches of the plurality of branches, each network node of the plurality of network nodes having a respective unique network node identifier associated therewith for each branch of which the network node is a member, the plurality of network nodes being logically arranged along the plurality of branches according to the nodes' respective network node identifiers, such that the network node identifiers vary monotonically along each branch, from the first end of the branch to the second end of the branch; and a base station adjacent the common root of the plurality of branches, comprising a wireless transceiver and having a network node identifier associate therewith; wherein:

each network node stores a representation of each of the network node's network node identifiers;

each network node comprises a respective sensor and a respective wireless transceiver;

each network node collects data with its sensor and, in response to receiving a command originating at the base station, transmits the data via its wireless transceiver using at least one network packet; and each network node of the plurality of network nodes, except a respective first network node at the first end and a respective last network node at the second end of the branch of which the network node is a member, forwards, via its wireless transceiver, network packets, such that each network packet is forwarded by a respective succession of network nodes whose respective network node identifiers vary monotonically along the succession of network nodes.

2. A linear sensor network according to claim 1, wherein each network node comprises:

a network packet source identifier, coupled to the wireless transceiver, that reads a source network node identifier in a received network packet;

a network packet destination identifier, coupled to the wireless transceiver, that reads a destination network node identifier in a received network packet;

a network node identifier comparator, coupled to the network packet source identifier and to the network packet destination identifier, that compares the stored representation of the node's network node identifier to the source network node identifier in the received network packet and to the destination network node identifier in the received network packet; and a network packet router, coupled to the network node identifier comparator, that determines whether to consider forwarding the received network packet based on a value of the source network node identifier, relative to the representation of the node's network node identifier, and on a value of the destination network node identifier, relative to the representation of the node's network node identifier.

3. A linear sensor network according to claim 2, wherein the network packet router determines whether to consider forwarding the received network packet without reference to a routing table.

4. A linear sensor network according to claim 2, further comprising:

a packet source and destination node identifier comparator, coupled to the network packet source identifier and to the network packet destination identifier, that compares the source network node identifier in the received network packet and the destination network node identifier in the received network packet; wherein:

the network packet router is coupled to the packet source and destination node identifier comparator and determines whether to consider forwarding the received network packet also based on the value of the source network node identifier, relative to the value of the destination network node identifier.

5. A linear sensor network according to claim 1, wherein:

for each node of the plurality of network nodes, except the first network node and the last network node, the node's location on the branch of which the network node is a member logically partitions the branch into a first portion and a second portion, relative to the node; and each network node of the plurality of network nodes, except the first network node and the last network node, forwards, via its wireless transceiver, network packets received from respective nodes on the first portion of the branch of which the network node is a member to at least one node on the second portion of the branch of which the network node is a member, and each network node, except the first network node and the last network node, forwards, via its wireless transceiver, network packets received from respective nodes on the second portion of the branch of which the network node is a member to at least one node on the first portion of the branch of which the network node is a member.

6. A method for forwarding network packets, the method comprising:

forming a plurality of partially overlapping branches from a plurality of network nodes, each branch of the plurality of branches having a respect first end and a respective second end, the plurality of branches having a common root, at least one network node of the plurality of network nodes being a member of at least two branches of the plurality of branches;

to each network node of the plurality of network nodes, assigning a unique network node identifier for each branch of which the network node is a member, such that the plurality of network nodes is logically arranged along the plurality of branches according to the respective network node identifiers, such that the network node identifiers vary monotonically along each branch, from the first end of the branch to the second end of the branch;

disposing a base station adjacent the common root of the plurality of branches, the base station comprising a wireless transceiver and having a network node identifier associate therewith;

storing in each network node a representation of each of the network node's network node identifiers;

at each network node, collecting data using a sensor of the network node;

in at least one of the plurality of network nodes, in response to receiving a command originating at the base station, transmitting the data via the network node's wireless transceiver using at least one network packet; and in each network node of the plurality of network nodes, except a respective first network node at the first end and a respective last network node at the second end of the branch of which the network node is a member, forwarding, via the network node's wireless transceiver, network packets, such that each network packet is forwarded by a respective succession of network nodes whose respective network node identifiers vary monotonically along the succession of network nodes.

7. A linear sensor network according to claim 1, wherein each network node identifier comprises a branch identifier.

8. A linear sensor network according to claim 1, wherein each network node that is a member of more than one branch stores information about each such branch.

9. A linear sensor network according to claim 1, wherein each network node that is a member of more than one branch stores information about at least one network node that is a member of each branch of the more than one branch.

10. A linear sensor network according to claim 9, wherein, for each network node of the at least one network node, the information comprises the network node identifier of the network node.

11. A linear sensor network according to claim 1, wherein each network node that is a member of more than one branch stores information about at least one network node that is: (a) within radio range of the network node and (b) a member of each branch of the more than one branch.

12. A linear sensor network according to claim 11, wherein, for each network node of the at least one network node, the information comprises the network node identifier of the network node.

13. A method according to claim 6, wherein assigning the unique network node identifier comprises assigning a network node identifier that comprises a branch identifier.

14. A method according to claim 6, wherein storing in each network node a representation of each of the network node's network node identifiers comprises, for each network node that is a member of more than one branch, storing information about each such branch.

15. A method according to claim 6, wherein storing in each network node a representation of each of the network node's network node identifiers comprises, for each network node that is a member of more than one branch, storing information about at least one network node that is a member of each branch of the more than one branch.

16. A method according to claim 6, wherein storing in each network node a representation of each of the network node's network node identifiers comprises, for each network node that is a member of more than one branch, for each such branch, storing information about at least one network node that is a member of such branch.

17. A method according to claim 16, wherein the information comprises the network node identifier of the network node that is a member of such branch.

18. A method according to claim 6, wherein storing in each network node a representation of each of the network node's network node identifiers comprises, for each network node that is a member of more than one branch, for each such branch, storing information about at least one network node that is (a) a member of such branch and (b) within radio range.

19. A method according to claim 18, wherein, for each network node of the at least one network node, the information comprises the network node identifier of the network node.

* * * * *

UNITED STATES PATENT AND TRADEMARK OFFICE
CERTIFICATE OF CORRECTION

PATENT NO. : 9,854,551 B2
APPLICATION NO. : 15/145088
DATED : December 26, 2017
INVENTOR(S) : Almir D. Davis et al.

It is certified that error appears in the above-identified patent and that said Letters Patent is hereby corrected as shown below:

In the Claims

In Column 31, Line 3 In Claim 1:
Replace "associate"
With "associated"

In Column 32, Line 18 In Claim 6:
Replace "respect"
With "respective"

In Column 32, Line 35 In Claim 6:
Replace "associate"
With "associated"

Signed and Sealed this
Thirty-first Day of July, 2018

Andrei Iancu
*Director of the United States Patent and Trademark Office*